United States Patent

Mandel

[15] 3,641,428
[45] Feb. 8, 1972

[54] KLYSTRON AUTOMATIC TUBE TESTER

[72] Inventor: Louis Mandel, Levittown, N.Y.
[73] Assignee: The United States of America as represented by the Secretary of the Navy
[22] Filed: Nov. 21, 1969
[21] Appl. No.: 878,737

[52] U.S. Cl. ........................................324/24, 324/73 AT
[51] Int. Cl. ....................................................G01r 31/22
[58] Field of Search .................................324/20–27, 73 AT

[56] References Cited

UNITED STATES PATENTS 2,796,582   6/1957   Cooper....................................324/23
3,416,069  12/1968   Mandel....................................324/24

Primary Examiner—Michael J. Lynch
Attorney—Richard S. Sciascia, Louis B. Applebaum and Philip Schneider

[57] ABSTRACT

The apparatus is a device for testing klystron tubes and consists of filament control and regulator means, filament continuity and emission test means, reflector logic and control means, beam voltage programming and control means, RF power and frequency-determining means and indicator means for applying voltages to the filament and other electrodes of integral cavity klystron tubes in a predetermined sequence whereby the static and dynamic operating characteristics of the tubes can be tested.

3 Claims, 22 Drawing Figures

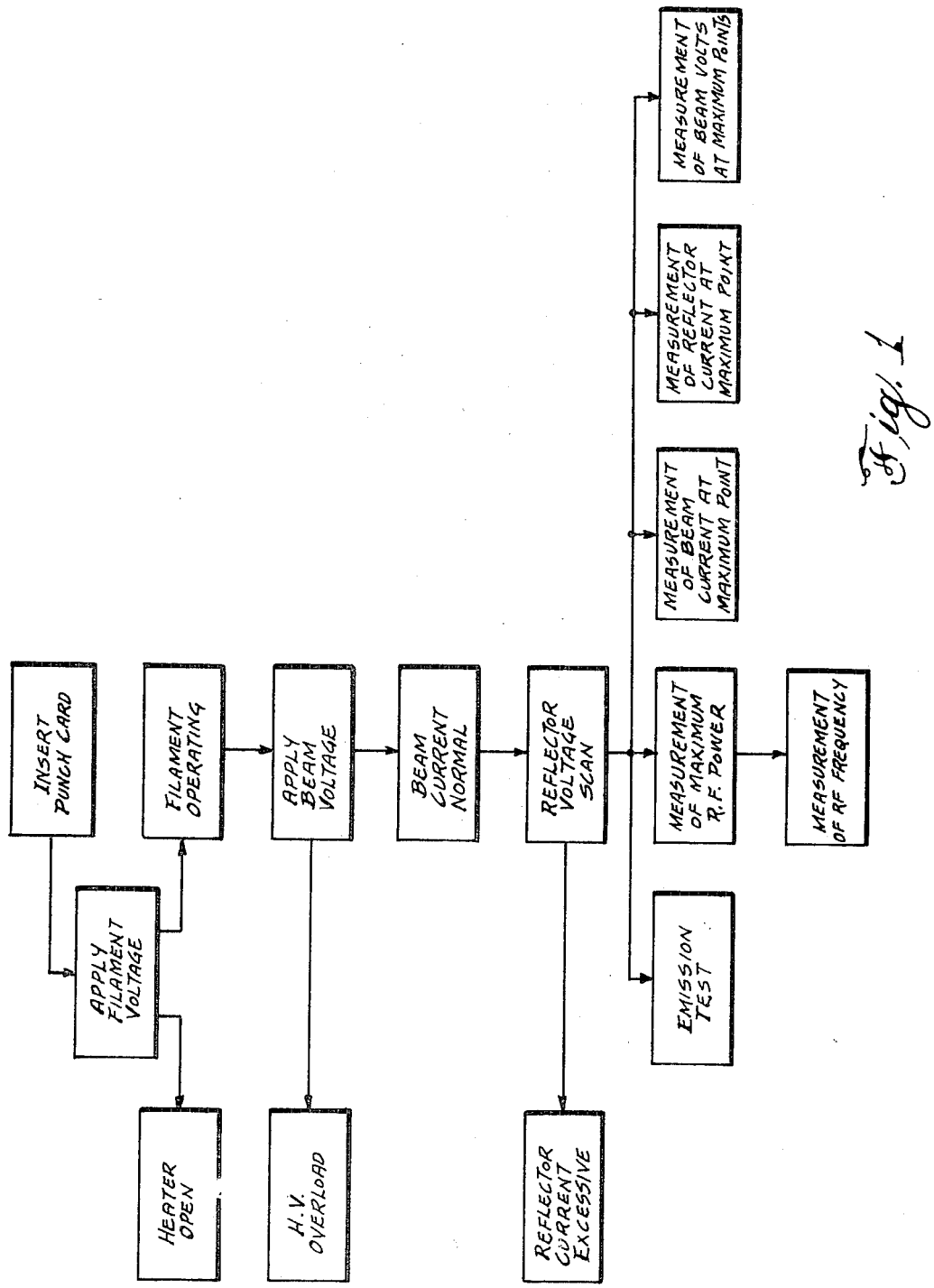

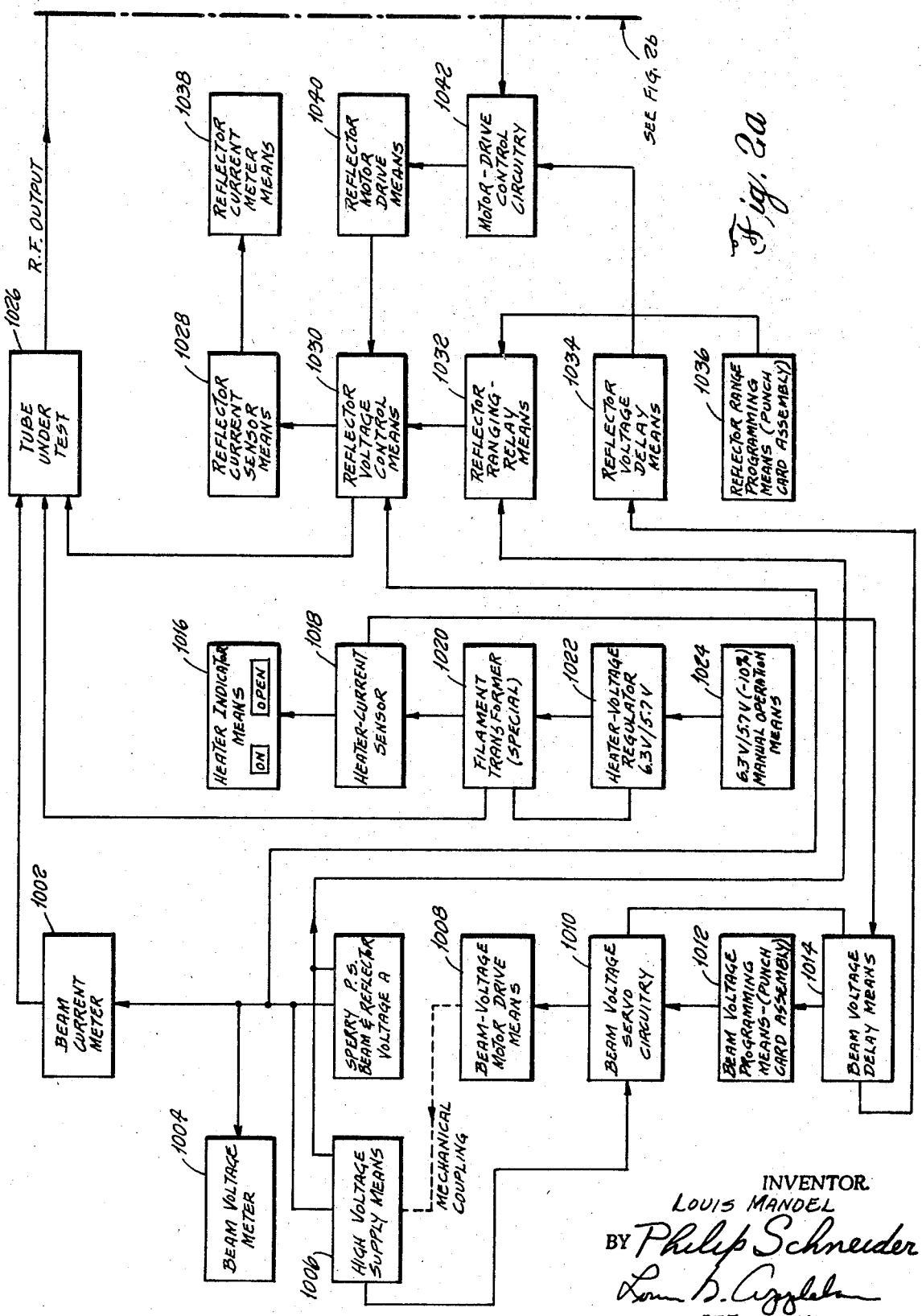

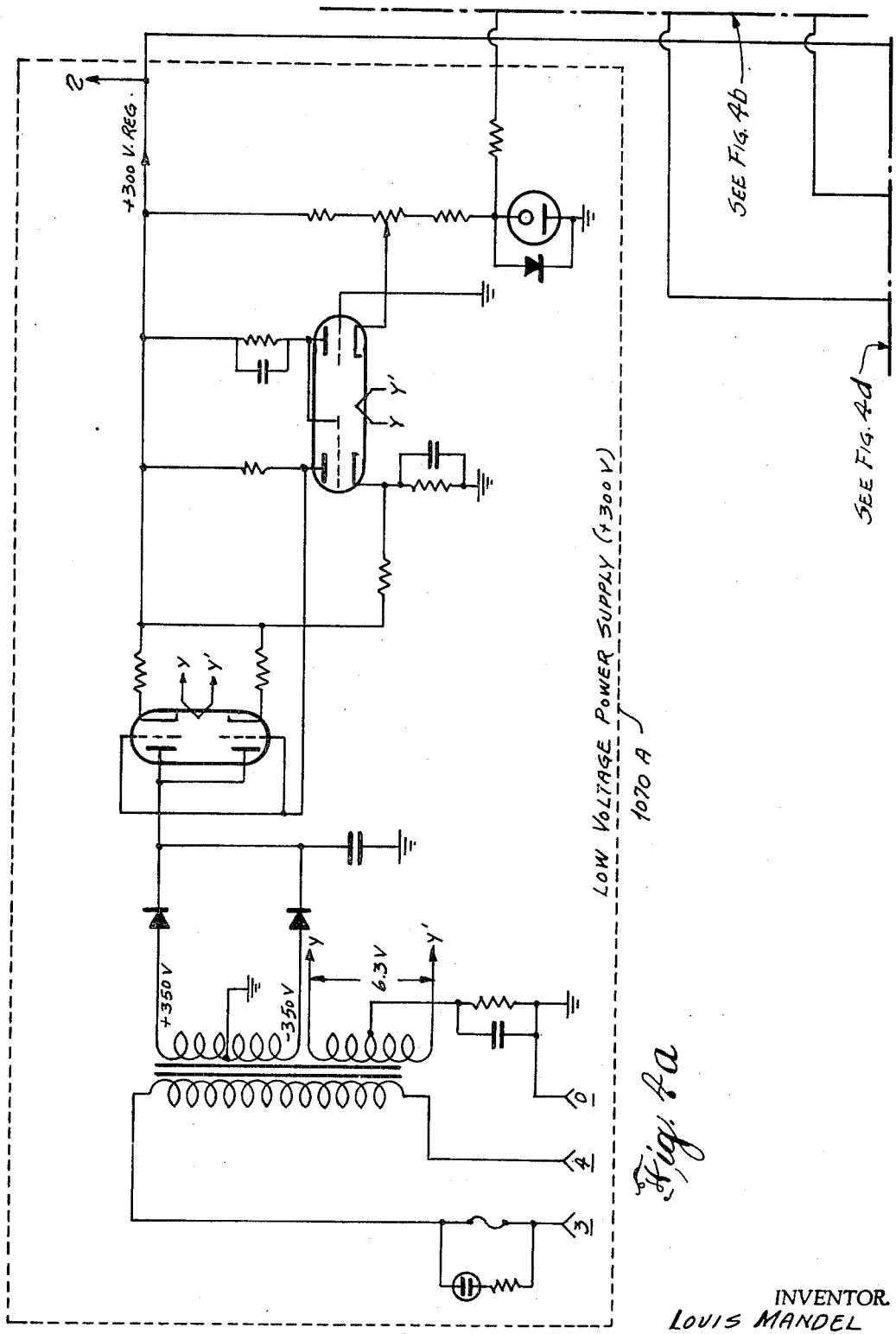

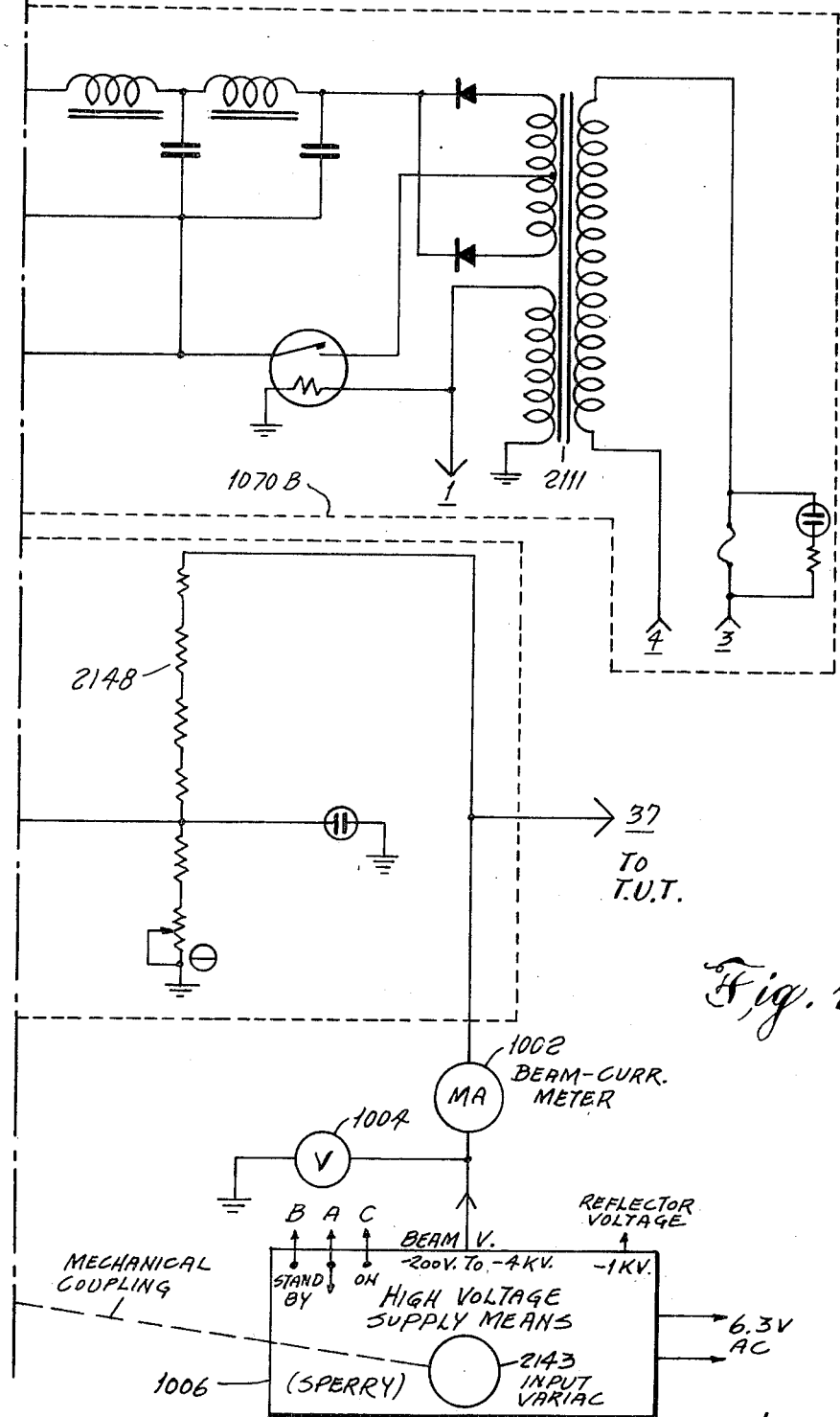

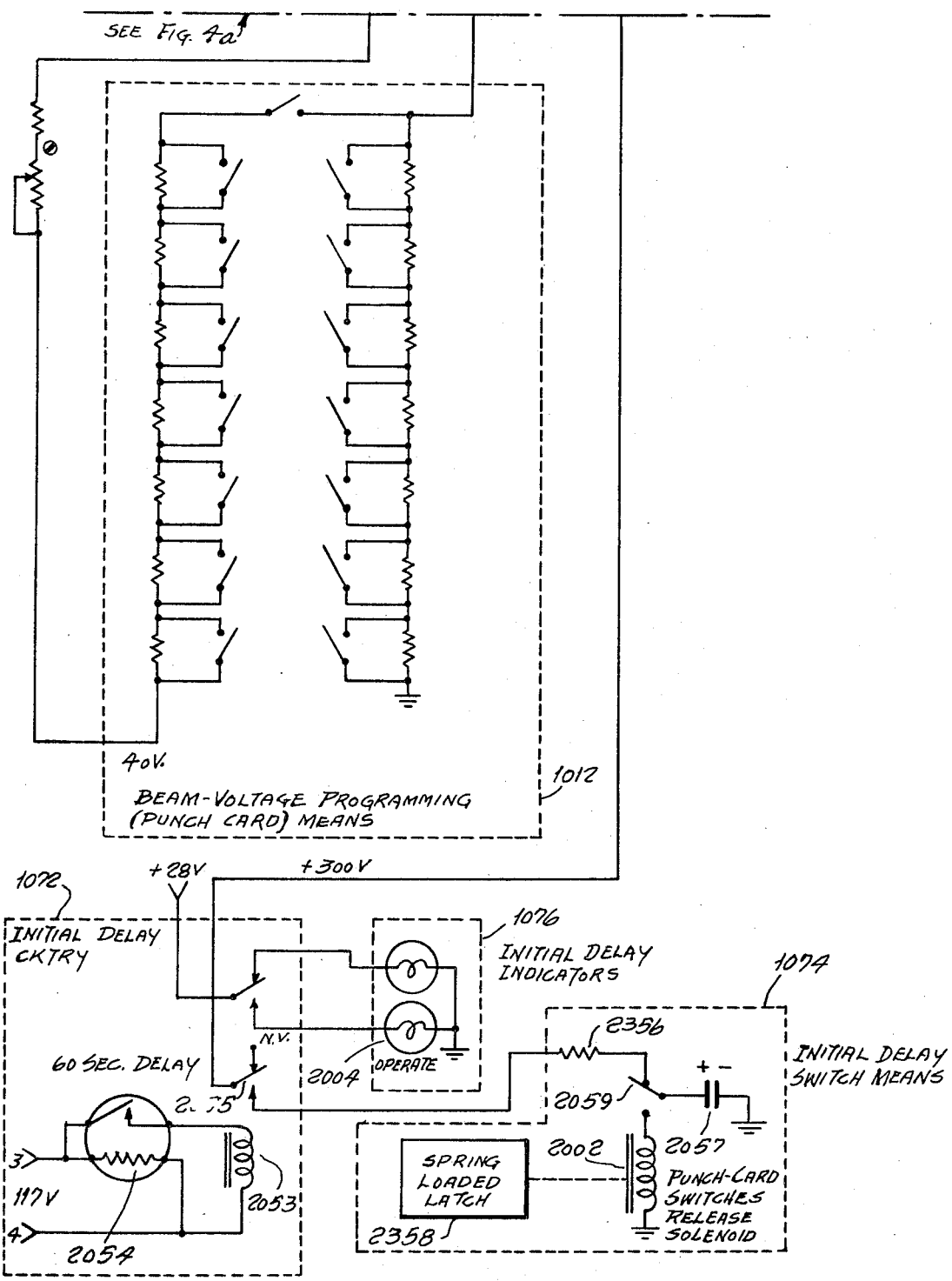

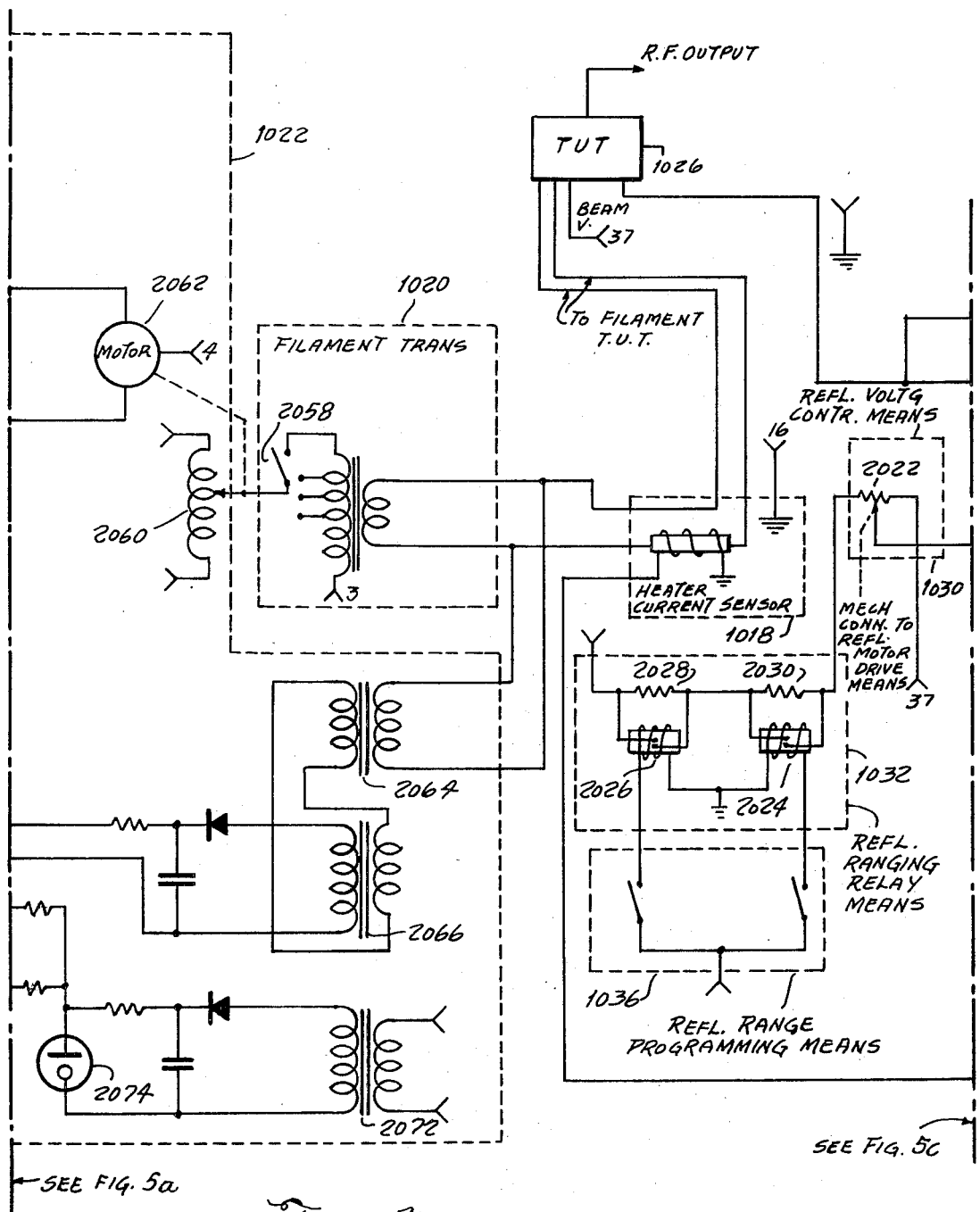

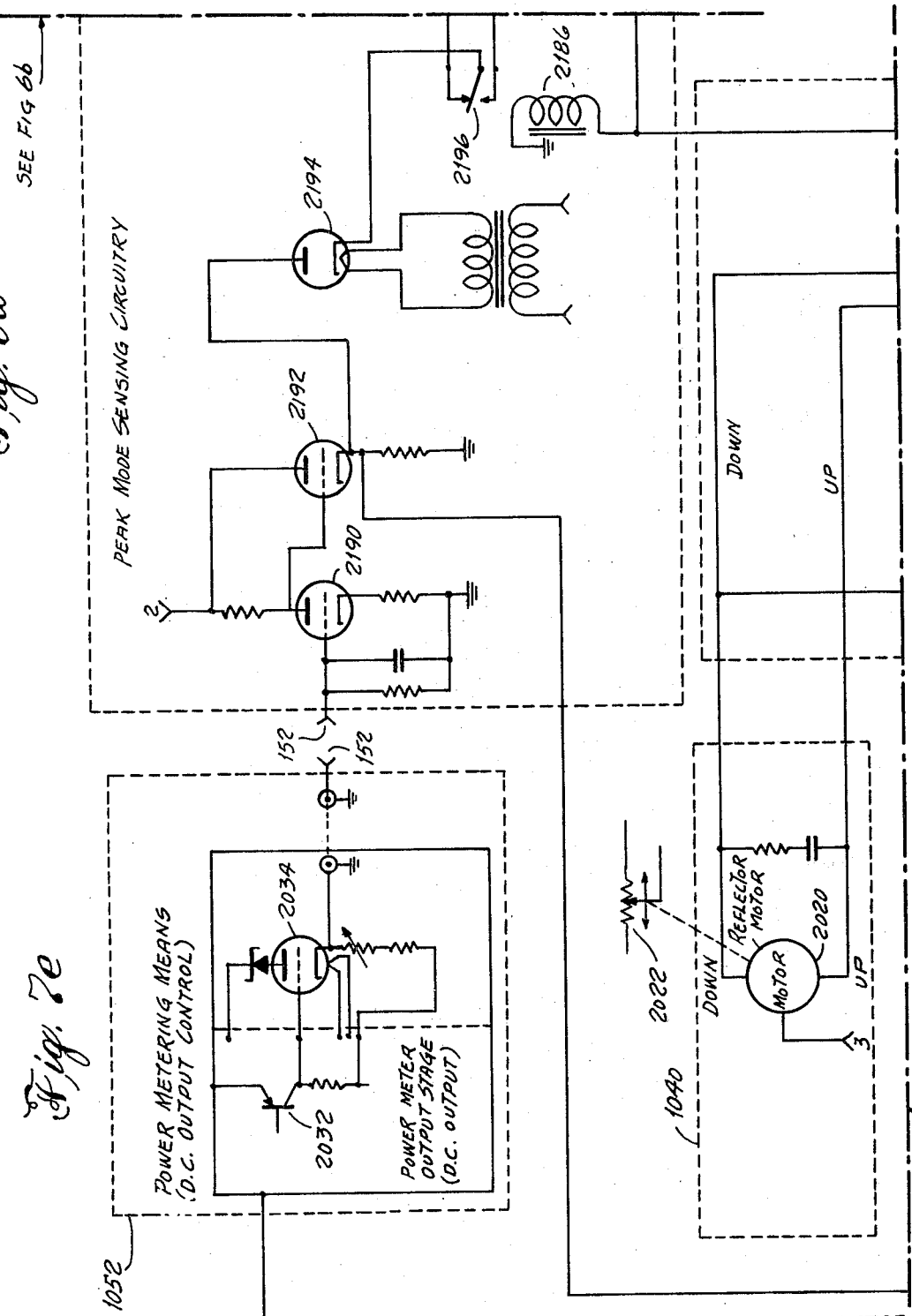

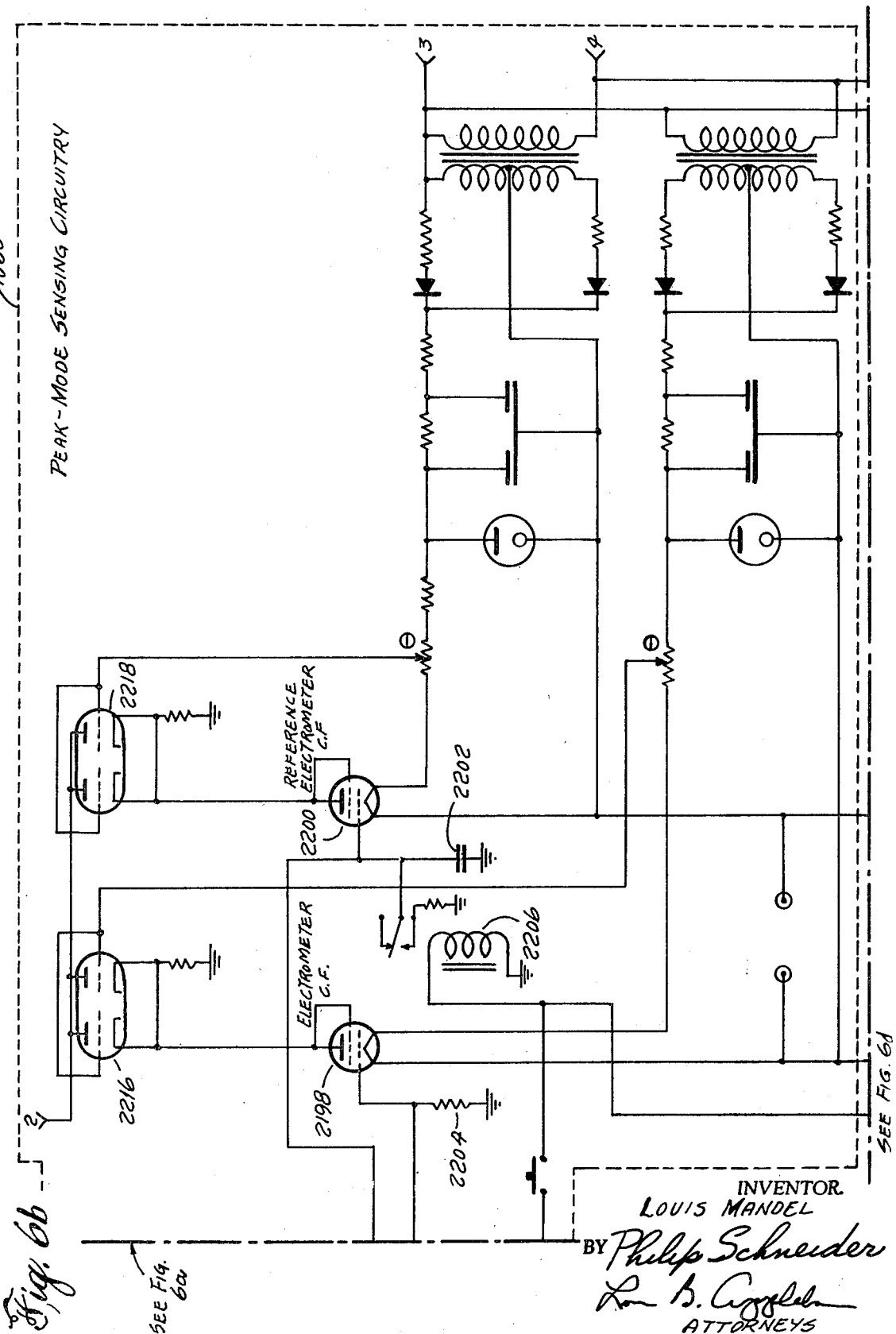

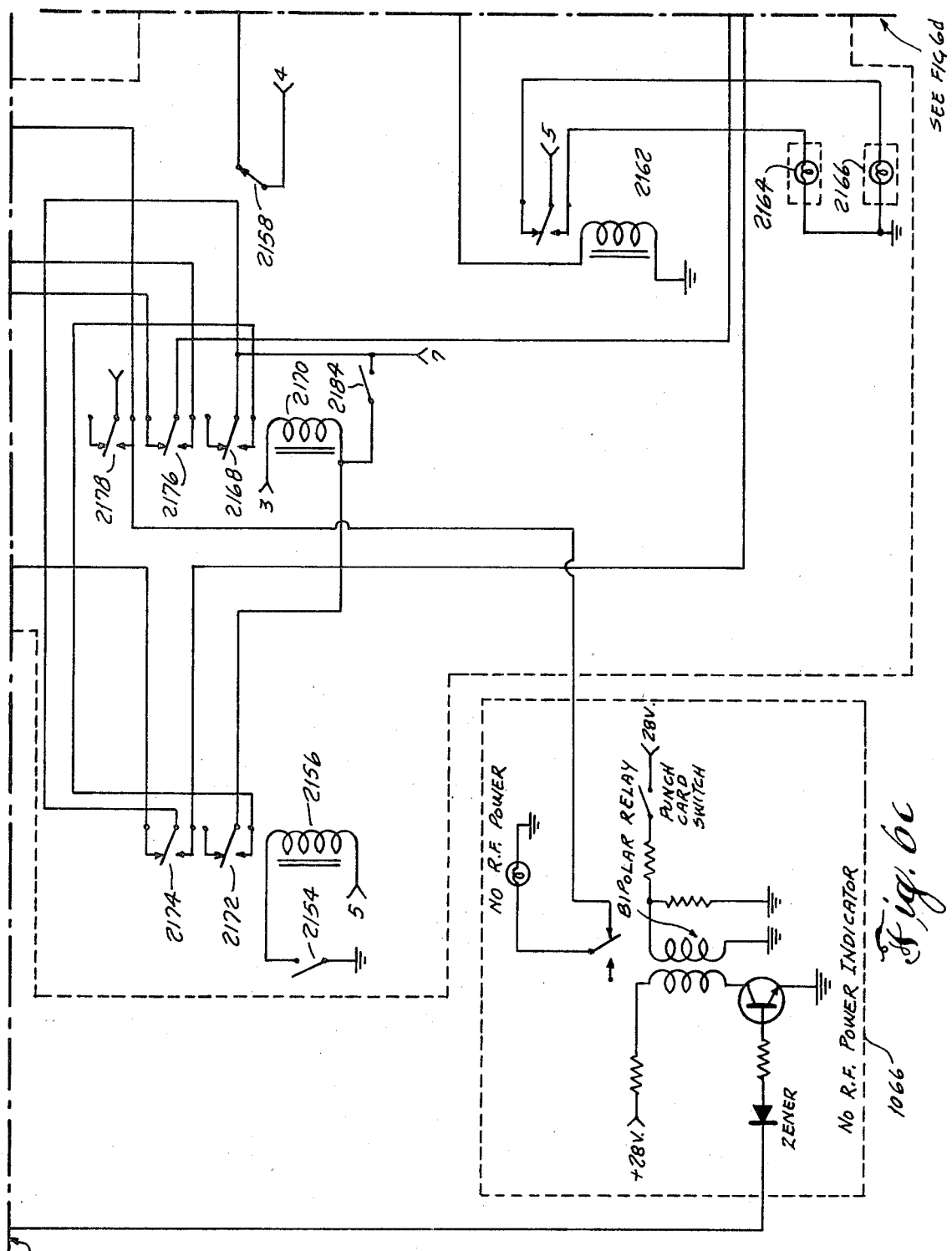

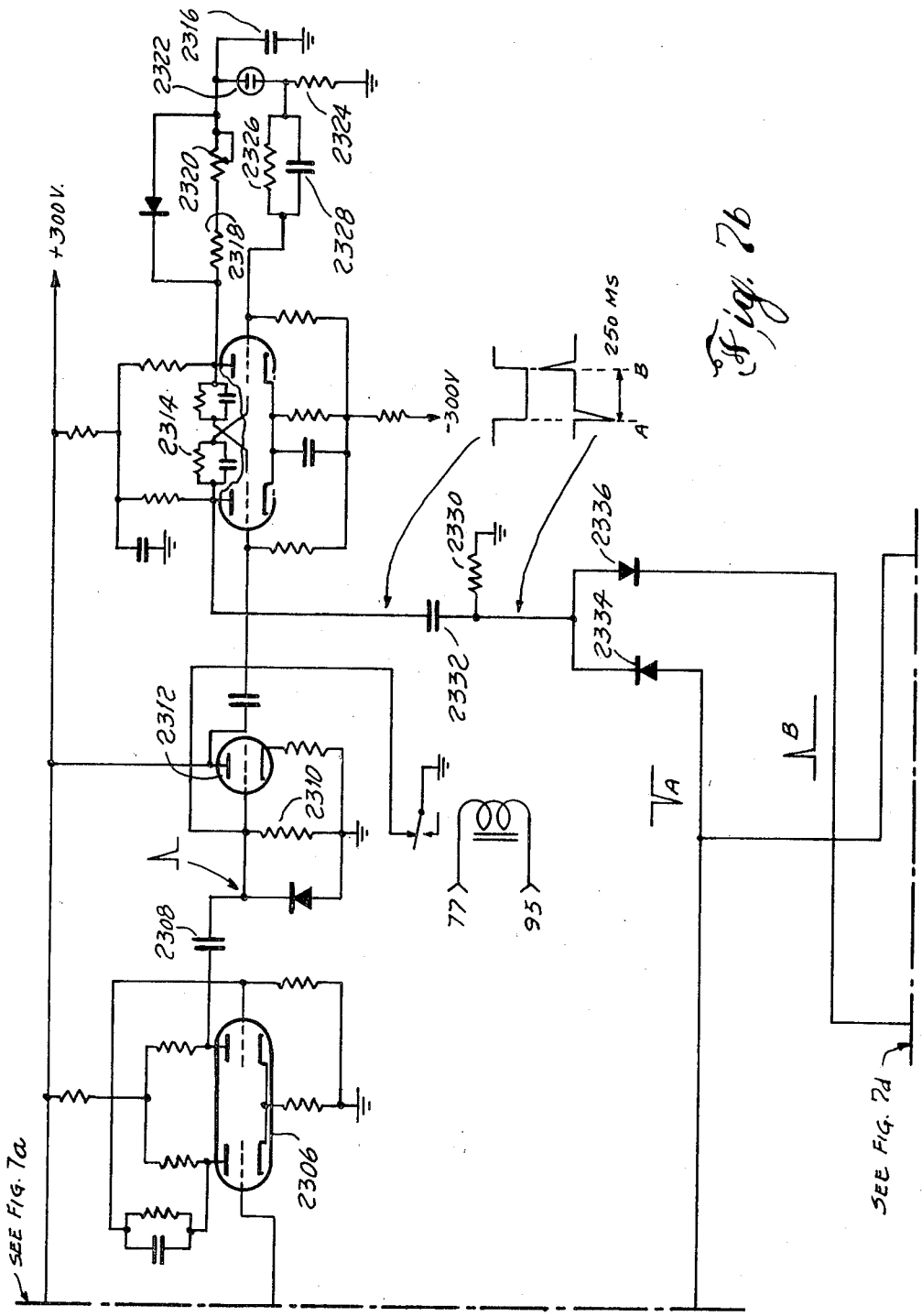

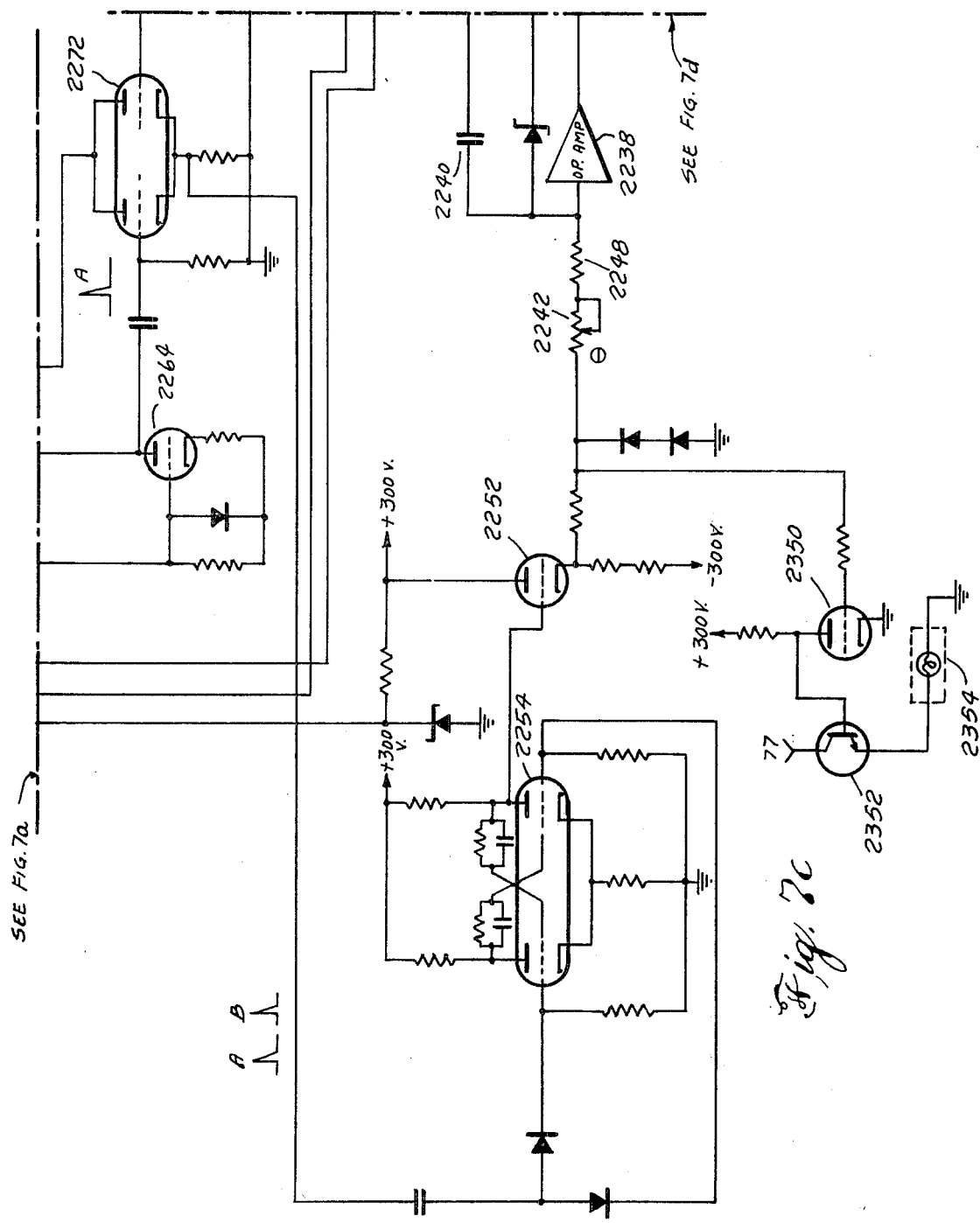

KLYSTRON AUTOMATIC TUBE TESTER

The invention described herein may be manufactured and used by or for the Government of the United States of America for governmental purposes without payment of any royalties thereon or therefor.

This invention relates to equipment for testing the static and dynamic operating characteristics of integral cavity klystron tubes.

Klystron electron tubes are widely used as amplifiers and oscillators for electrical waves in the gigahertzian frequency region, e.g., as tubes for local oscillators in radar systems. There has not up to now, been any equipment available for the dynamic RF testing of klystron tubes and the determination of their operational capabilities.

Accordingly, an object of this invention is to test the static and dynamic operating characteristics of integral cavity klystron tubes.

The objects and advantages of the present invention are accomplished by apparatus which sequentially applies the proper supply voltages to the heater, anode and reflector of the klystron so that heater continuity is checked and, if found in proper condition, maximum RF power, output frequency, and beam voltage and current at maximum RF power are checked. Various types of fault indications are also provided.

Figure 2B:
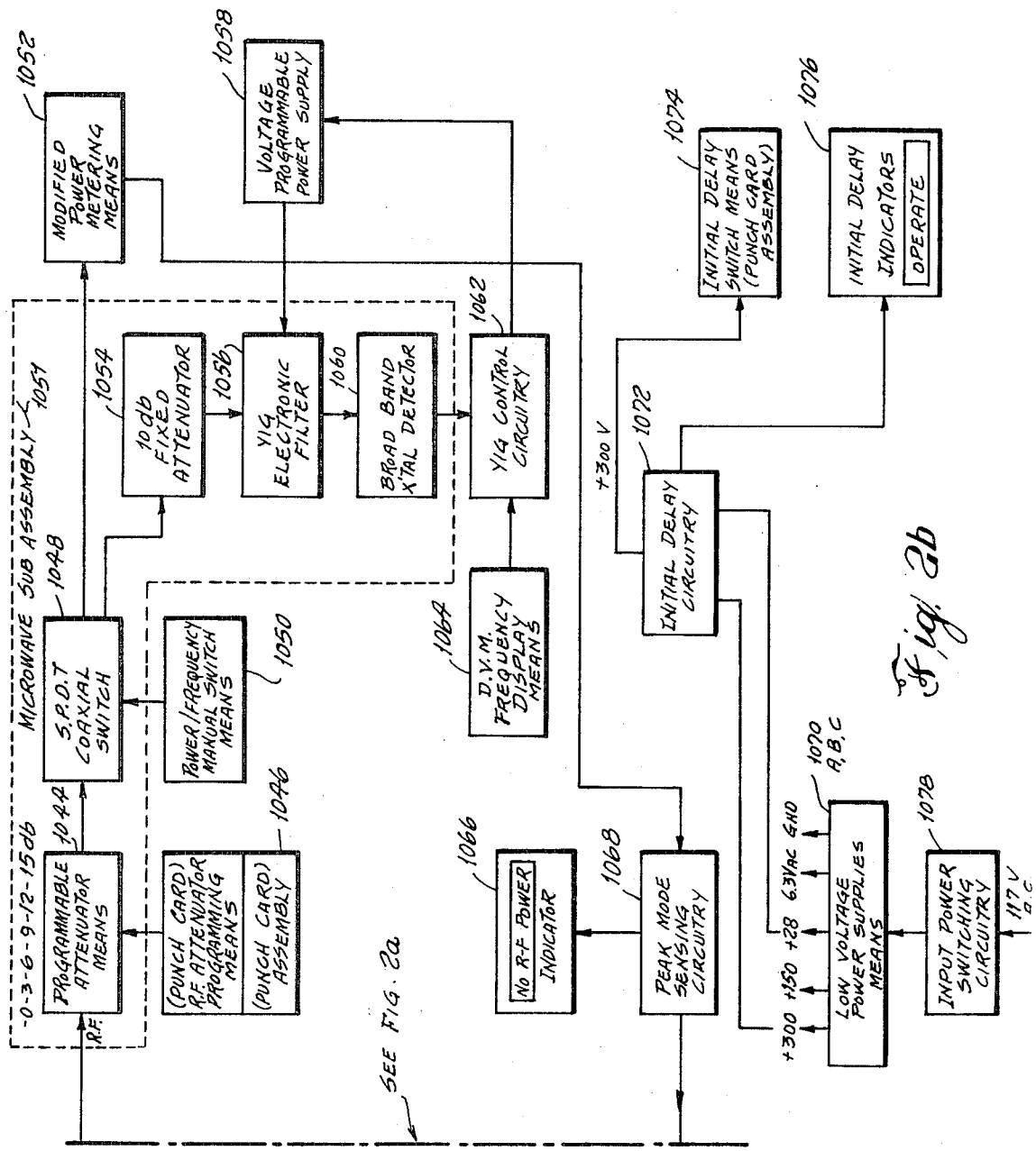
Figure 3:
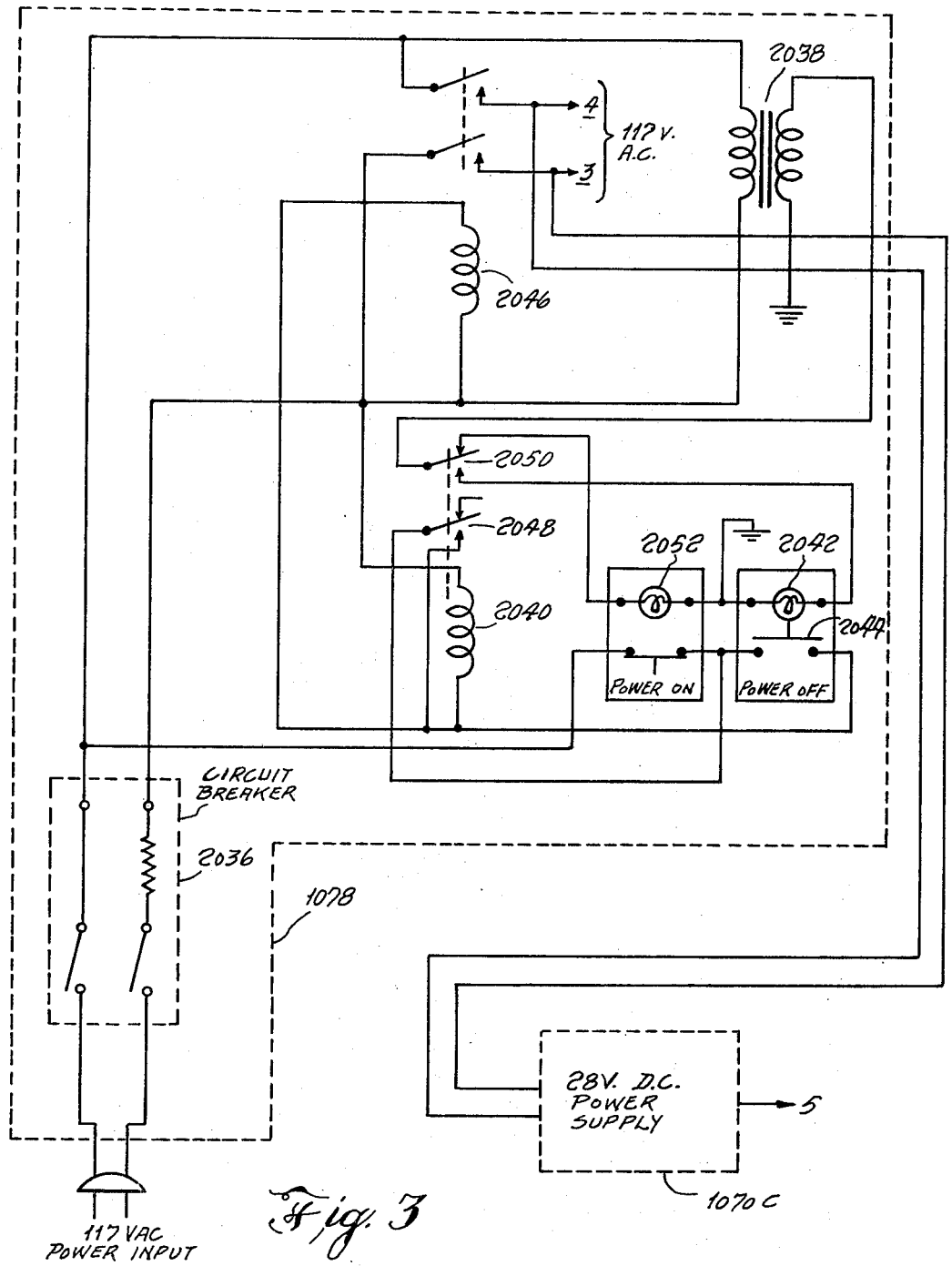
Figure 4B:
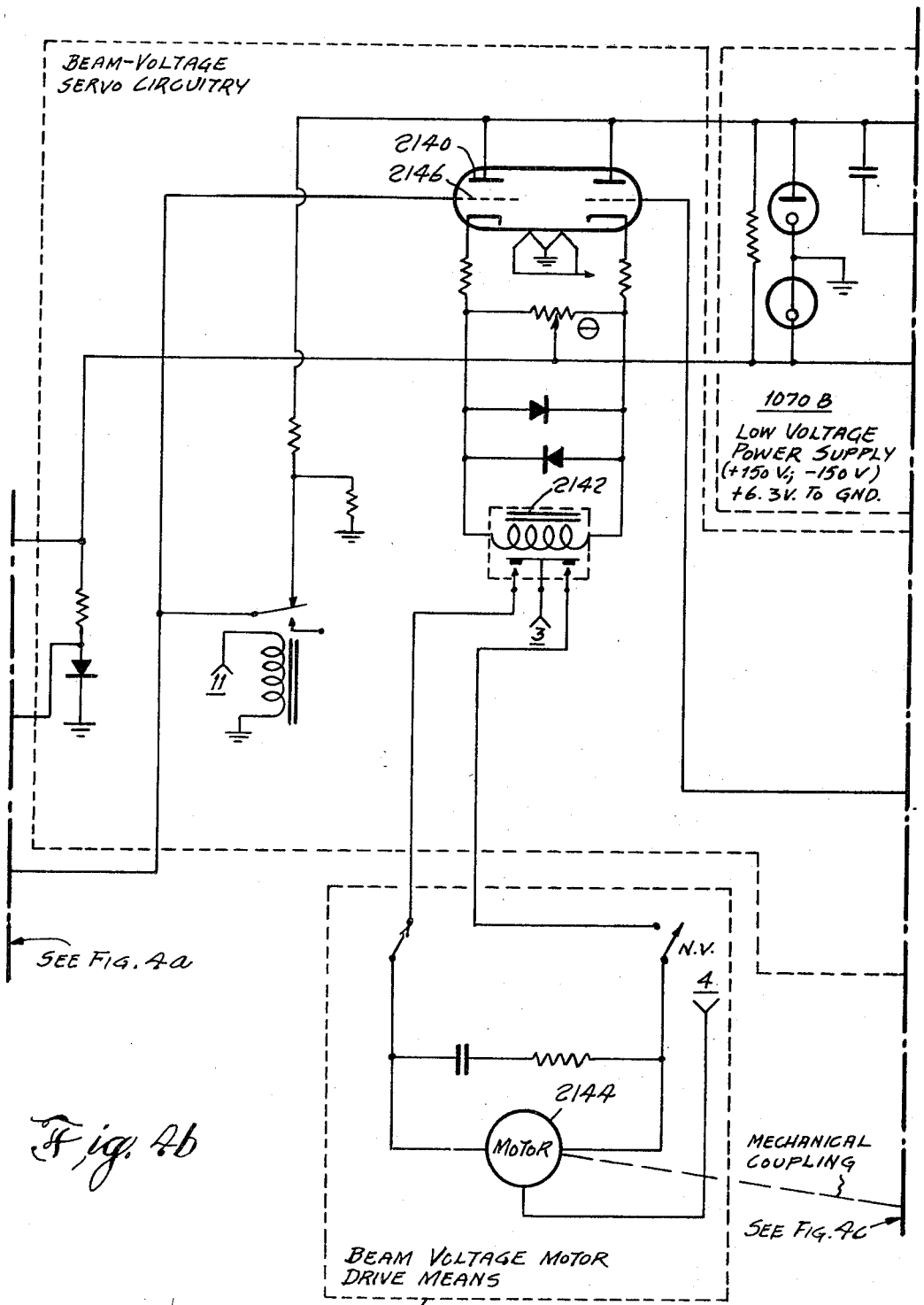
Figure 4E:
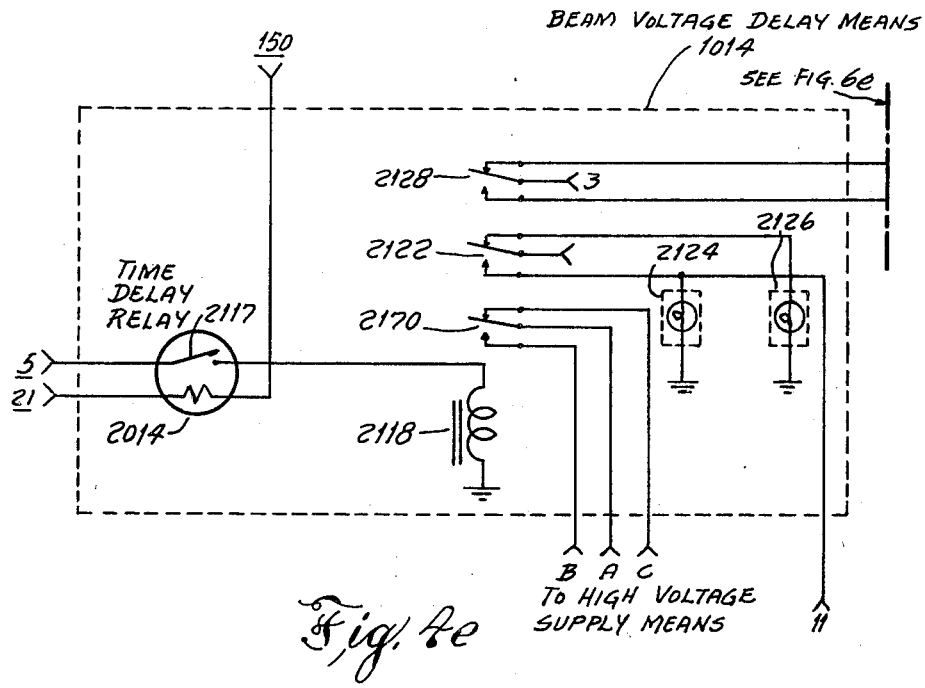
Figure 6E:
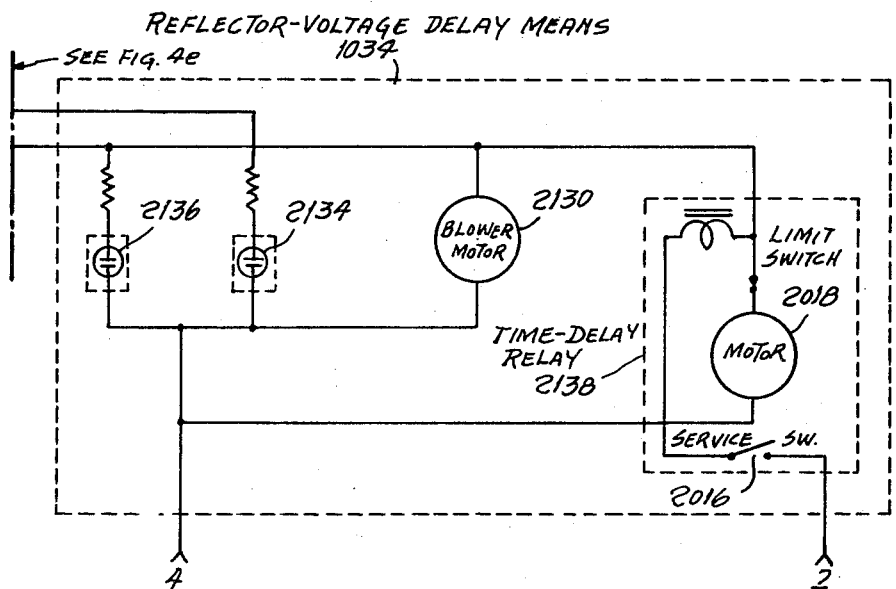
Figure 5A:
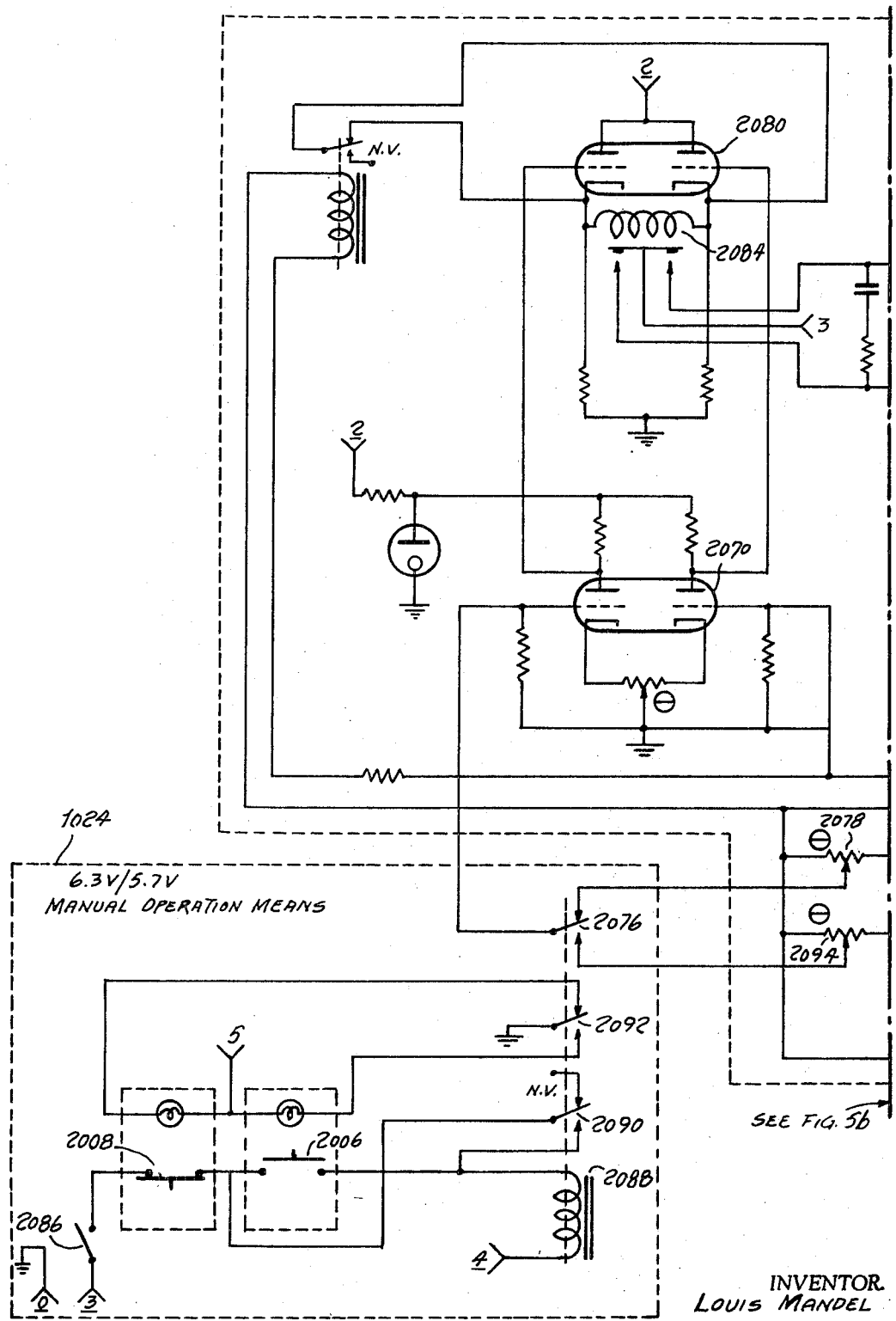
Figure 5C:
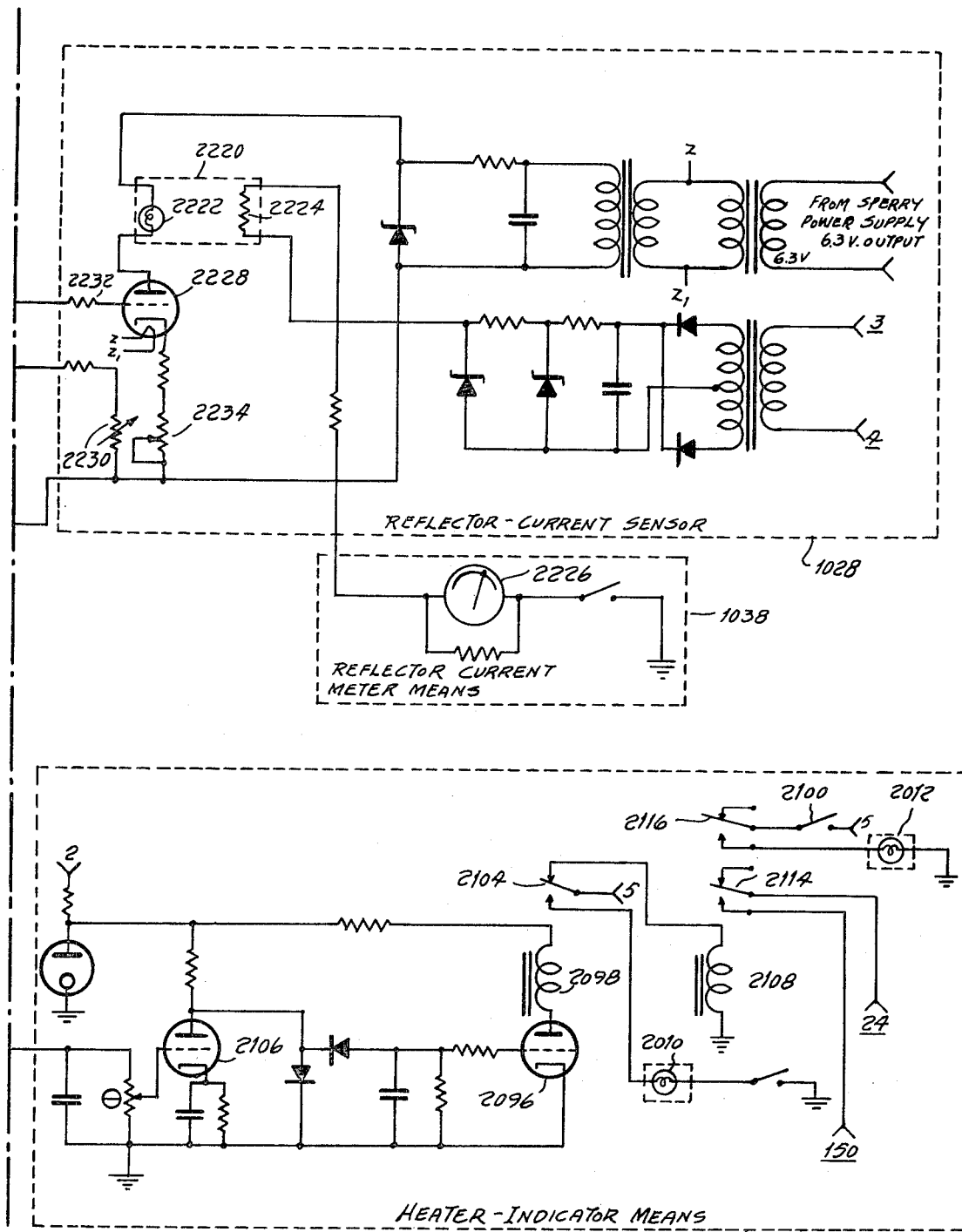
Figure 6D:
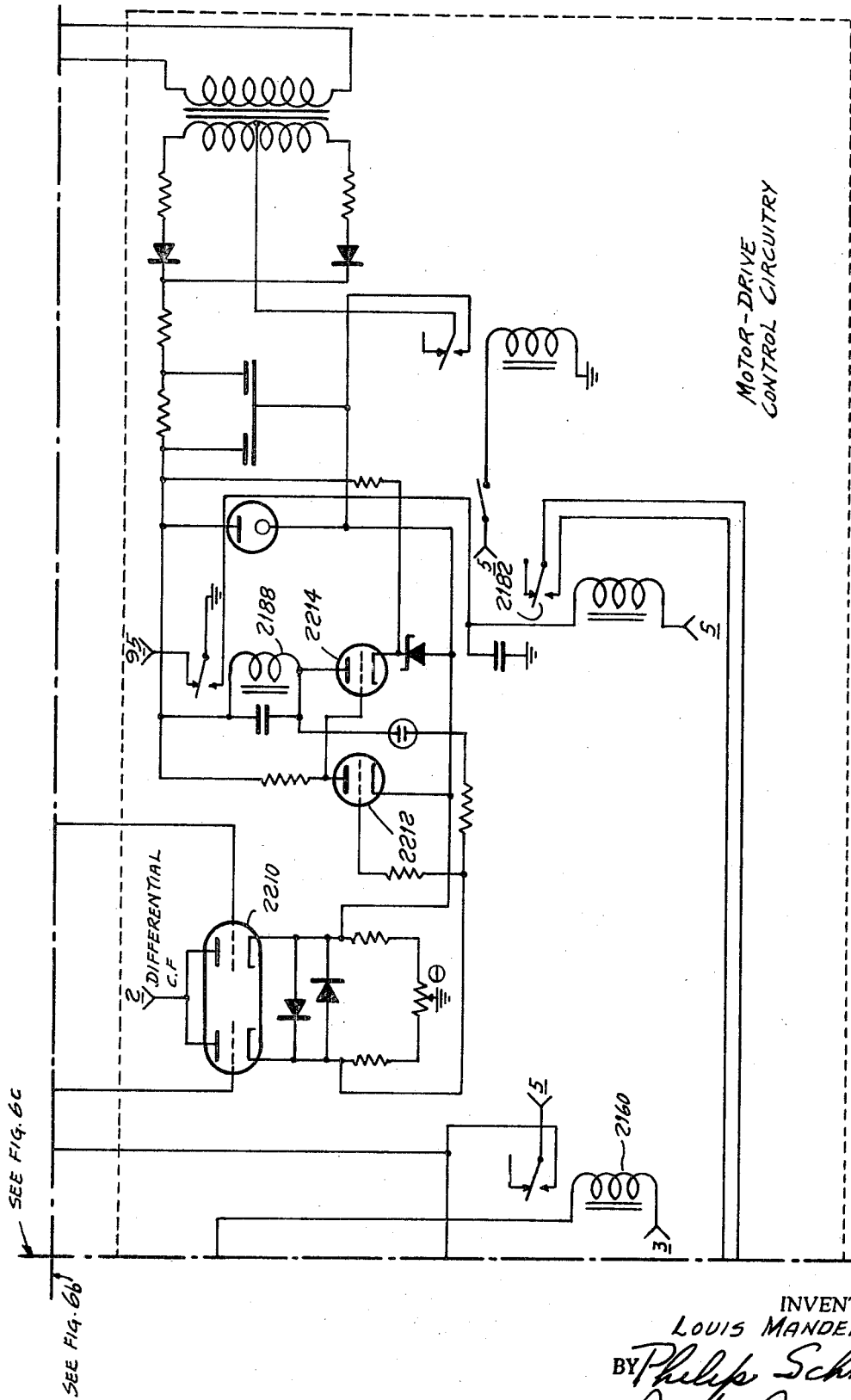
Figure 7A:
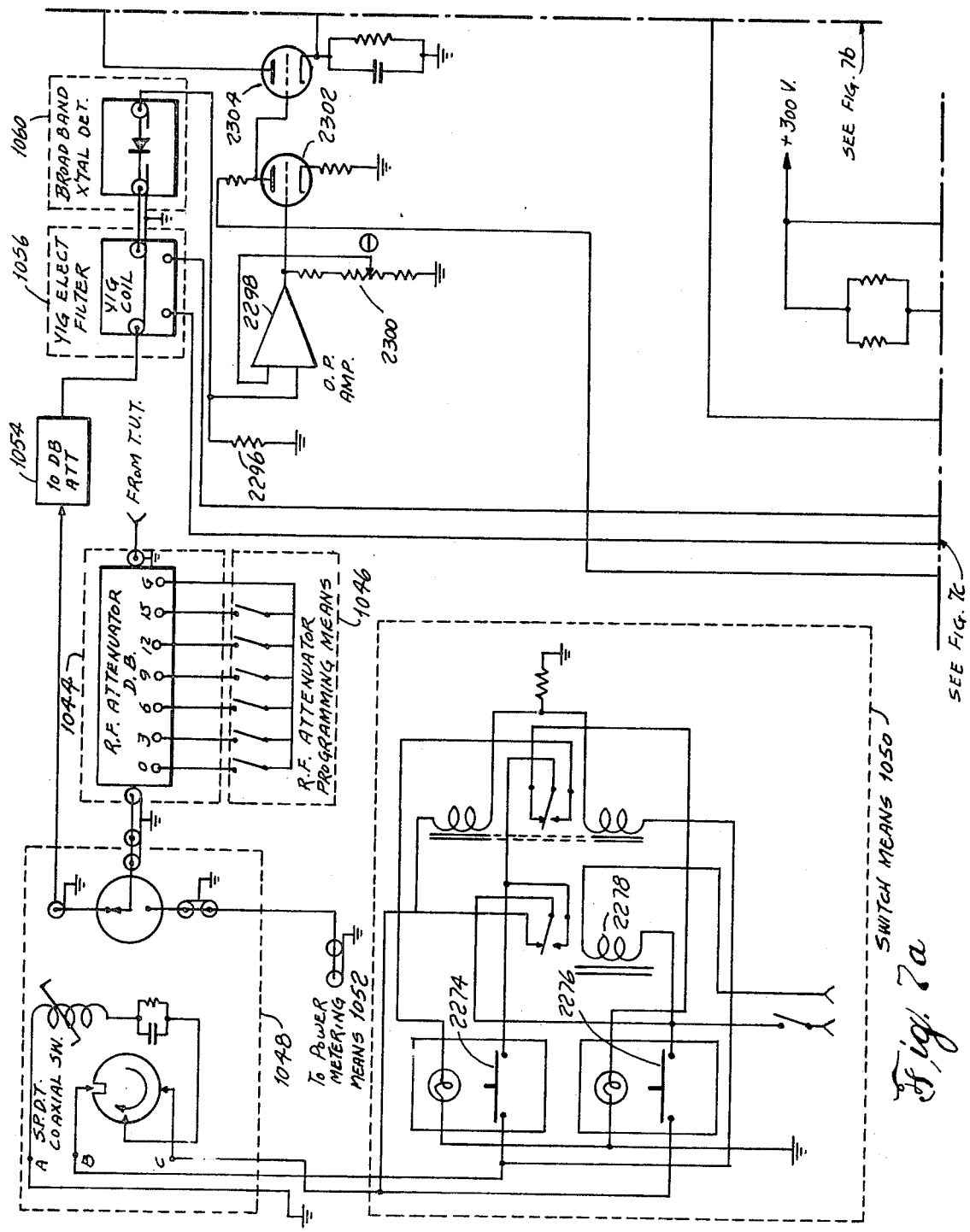
Figure 7D:
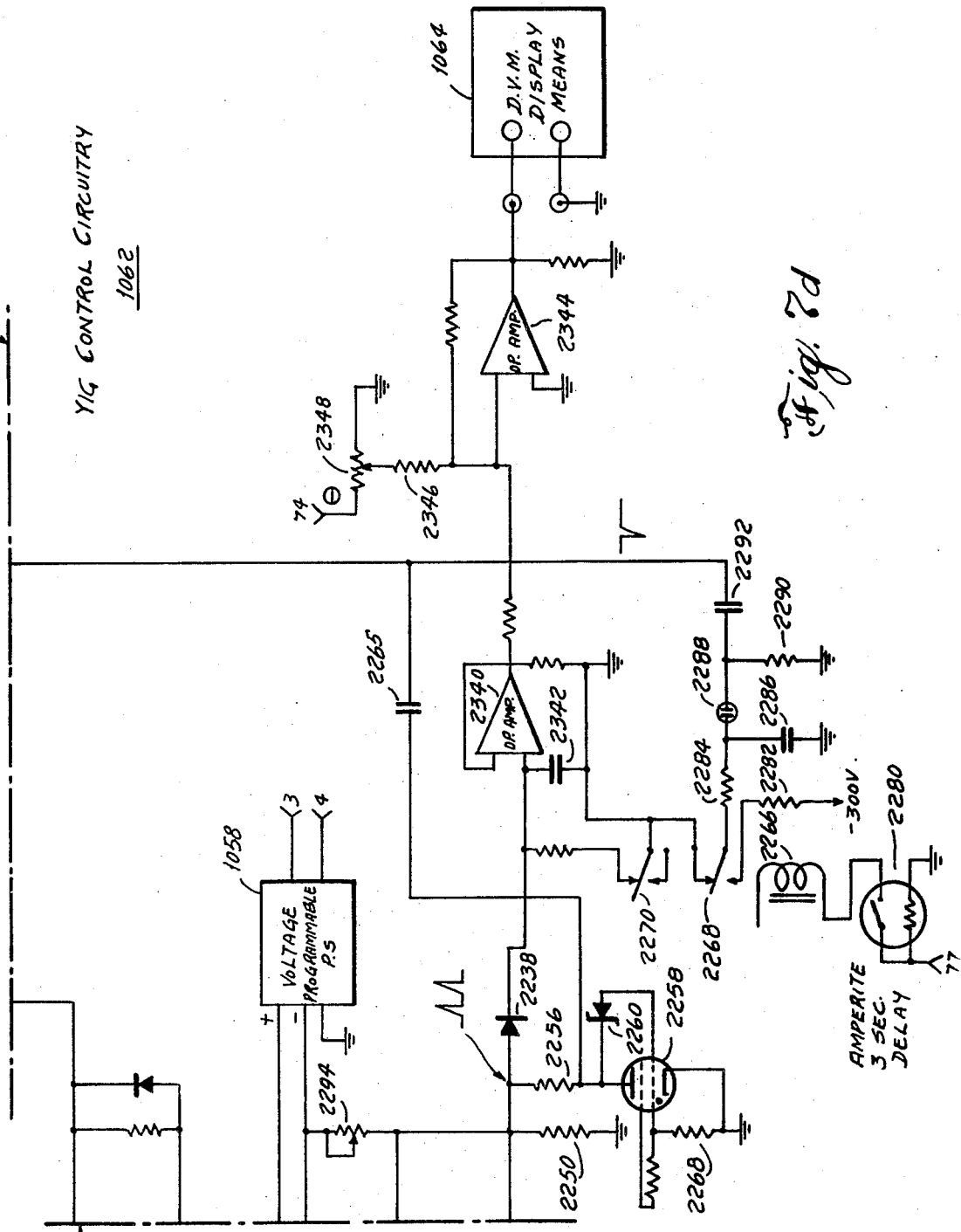

Other objects, advantages and novel features of the invention will become apparent from the following detailed description of the invention when considered in conjunction with the accompanying drawings wherein:

FIG. 1 is a sequence-of-operations flow chart;

FIGS. 2a and 2b constitute a block diagram of an embodiment of the invention;

FIG. 3 is a schematic diagram which can be used in the blocks of FIG. 1;

FIGS. 4a–e are the beam voltage programming and control circuitry;

FIGS. 5a–c are the filament regulation control, continuity and emission circuitry;

FIGS. 6a–e are the reflector logic and control circuitry; and

FIGS. 7a–e are the RF power and frequency determining circuitry.

GENERAL FUNCTIONAL DESCRIPTION OF KLYSTRON TEST SET

FIG. 1

The insertion of a punchcard initiates a sequence of tests starting with heater continuity. If the heater is open, the beam voltage is not applied to the tube under test, the test sequence is discontinued, and the heater defect is indicated by a panel light. If operation of the heater is satisfactory, it is indicated by another panel light, and the test sequence proceeds to the RF power search mode in which the test set automatically locates the value of reflector voltage corresponding to the peak of the highest RF power output mode of the tube under test. This is accomplished by scanning the negative reflector voltage from a preset minimum to a maximum value determined by the punchcard while the RF power output is monitored both on a power meter and by a detected voltage proportional to the output power which is used to charge a capacitor. At the end of the reflector voltage sweep this capacitor is charged to the maximum value of voltage applied to it during the sweep. This corresponds to the maximum RF power output point of operation. The stored voltage is then used as a reference voltage and in conjunction with a voltage comparator to reset that value of reflector voltage providing maximum RF output as the reflector voltage sweep is scanned in the reverse direction. When maximum power output is restored, it is detected by the voltage comparator circuit which stops the reflector voltage sweep and maintains tube operation at the maximum RF power output point. The beam and reflector current at this operating point are indicated by panel meters and the RF power output is indicated by a microwave power meter. In case of beam current overload, the high voltage is turned off and the overload is indicated by a panel light. Emission tests are performed by operating the tube at normal and reduced heater voltage by use of manual selector switches.

To read frequency it is necessary to depress the RF FREQUENCY indicator switch which switches the RF output power from the power meter to the YIG filter control circuitry. The YIG filter is an electronically tuned band-pass filter having a linear frequency versus tuning current characteristic. The YIG tuning current is recurrently swept over the operating range of the filter. During each sweep a value of tuning current is reached at which the filter resonates at the operating frequency of the klystron tube under test (TUT) 1026. At this value of tuning current, RF power passes through the filter. The detected signal is then applied to a circuit which stops the sweep. After 250 milliseconds delay, the sweep is automatically restarted. The magnitude of the tuning current during the delay is related to the resonant frequency. A voltage proportional to this tuning current is applied to a digital voltmeter which is calibrated to indicate the operating frequency in gHz.

BLOCK DIAGRAM DISCUSSION

(FIG. 2)

The application of line power activates the initial delay circuitry 1072 and causes the INITIAL DELAY indicator 1076 to light. The purpose of this delay is to provide adequate warmup time for the klystron test set. During this delay period, the punchcard switch 2059 of the initial delay switch means 1074 does not respond upon insertion of a punchcard. At the completion of the delay period the OPERATE indicator 2004 lights and the test set is ready for normal operation.

The filament (heater) voltage for the tube under test (TUT) 1026 is obtained from a filament transformer 1020 and is controlled by the heater voltage regulator circuit 1022. The regulated filament supply has a normal output of 6.3 volts. By means of a manual switch 2006 located on the punchcard assembly, this voltage can be reduced to 5.7 volts (−10 percent) for the filament emission test. An additional manual switch 2008 located on the punchcard assembly, is used to reset the filament voltage to the normal value.

A heater current sensor 1018 detects the presence of filament (heater) current. If there is no current flow, a light 2010 in the heater indicator means 1016 indicates HEATER OPEN and further testing of the TUT is automatically discontinued. If there is heater continuity, a light 2012 indicates HEATER OPERATING and the beam voltage delay relay 2014 of the beam voltage delay means 1014 is activated.

At the completion of a 30-second delay, the beam voltage servo circuitry 1010, adjusts the high-voltage supply means 1006 for the required beam voltage to be applied to the TUT. Meters 1002 and 1004 are provided for monitoring beam current and voltage, respectively. The 30-second delay circuit also initiates operation of the 45-second reflector delay circuit 1034. At the completion of this delay, a switch 2016 is energized by a cam on a timing motor 2018 causing the reflector motor 2020 to operate.

The reflector motor 2020 is coupled to a multiturn potentiometer 2022, located in the reflector voltage control means 1030 which functions as the reflector voltage control. The constant-speed motor 2020 driving the potentiometer 2022 generates a linear ramp voltage. To limit the maximum excursion of this voltage, the reflector ranging relays 2024 and 2026 in the reflector ranging relay means 1032 and controlled by the punchcard circuitry, switch in resistors 2028 and 2030 in series with the reflector potentiometer 2022.

The output voltage of the potentiometer 2022 is applied to the reflector of the TUT 1026 through a reflector current sensor circuit 1028. The reflector current sensor circuit 1028 provides metering of total reflector current which is displayed by reflector current meter 1038.

The RF output power from the TUT 1026 is coupled to the programmable attenuator means 1044. The power level is adjusted by means of a remotely controlled turret attenuator 1044 whose setting is determined by the programmed punchcard 1046. The power is then transmitted through a remotely controlled single-pole, double-throw coaxial switch 1048 to either the power meter 1052 for power measurement or the YIG filter circuitry for frequency measurement. Initially the coaxial switch 1048 is automatically preset for power measurement. A DC voltage proportional to RF power input is obtained from the power meter 1052 and applied to the peak mode sensing circuitry 1068. This sensing circuit controls the motor drive control circuit 1042 which varies the reflector voltage. When the sensing circuit 1068 determines the maximum value of DC voltage obtained from the power meter 1052 it stops the reflector voltage sweep and maintains the corresponding value of reflector voltage. This value of reflector voltage results in the mode of operation providing maximum RF output power from the TUT 1026.

After the power measurement is obtained, the output of the TUT 1026 is switched to the YIG control circuitry 1062 for frequency measurement by means of the power frequency switch 1050. The coaxial switch 1048 can be reset for power measurement by means of the power frequency switch means 1050. These switches cannot be operated until the reflector voltage sweep is stopped and the TUT 1026 is operating at the peak of the high-power mode. The 10 db. attenuator pad 1054 in front of the YIG filter 1056 serves to limit the input power to a suitable level.

When the YIG filter 1056 is tuned to the operating frequency of the TUT 1026, RF power is transmitted through it and a voltage proportional to the detected power from the filter is applied to the input of the YIG control circuit 1062. A voltage output from the YIG control circuitry 1062 is used to program a low-voltage power supply 1058 which provides the necessary current to control the YIG filter 1056.

An additional voltage output from the YIG control circuitry 1062 is applied to the digital voltmeter 1064. This voltage is proportional to the YIG tuning current and is adjusted in value to make the digital voltmeter reading in volts equal to the resonant frequency of the YIG filter 1056 in gHz, as determined from the tuning characteristic of the YIG filter 1056. Therefore, the digital voltmeter 1064 provides a direct reading frequency in gHz.

DETAILED CIRCUIT DESCRIPTION

It should be noted that most of the component circuits utilized in this device are well known or within the competence of one skilled in the electronics art. Several parts of the device are novel, however, and are patented or being patented. Thus, the peak mode sensing circuitry 1062 is the subject of U.S. Pat. No. 3,258,714. However, in the present device, in place of the RF detector 13 used therein, a DC voltage proportional to the output power of the klystron is tapped off the output stage 2032 of the General Microwave Co. thermoelectric power meter used in the power-metering means 1052 and fed through a cathode follower buffer stage 2034 to the peak mode sensing circuitry 1068.

The measurement of the klystron reflector current is the subject of U.S. Pat. No. 3,416,069. This patent shows and explains the structure and operation of the reflector current sensor means 1028 and the reflector current meter 1038.

The measurement of the frequency of the output of the klystron is the subject of copending patent application, Ser. No. 750,604, filed Aug. 8, 1968, by the present inventor. This application shows and explains the structure and operation of the YIG electronic filter 1056, the broadband crystal detector 1060, the voltage-programmable power supply 1058 and the YIG control circuitry 1062.

LINE POWER CONTROL (see FIG. 3, block 1078)

When the 15 a. main switch/circuit breaker 2036 (see FIG. 3) is switched on, 117 volts AC is applied to the primary of transformer 2038. The transformer output (25.2 volts) is applied through a relay 2040 to the punchcard assembly to energize the lamp 2052. (Although the punchcard assembly is physically a single unit in the test set, it has been separated into functional blocks 1012, 1036, 1046 and 1074 on the circuit block diagram, FIG. 1. In the circuit diagram, FIG. 3, the punchcard components are not identified as such but appear as individual switches in their associated circuits). When the momentary contact switch 2044 is depressed, 117 volts is applied across the coils of the relays 2046 and 2040. Relay 2046 applies 117 volts to the test set. Contacts 2048 are used in a latching circuit to keep these relays energized. Contacts 2050 are used to switch the voltage from the POWER OFF indicator 2052 to the POWER ON indicator 2042.

INITIAL DELAY CIRCUIT (see FIG. 4, blocks 1072, 1076, 1074)

To permit adequate warmup of the test set, a 60-second delay relay 2054 (an Amperite delay relay) in the initial delay circuitry 1072 is used to prevent punchcard operation. This is accomplished by delaying the application of +300 volts DC to the release solenoid 2002 of the punchcard switch assembly. At the completion of this delay, the punchcard may be inserted and tube testing may be initiated (i.e., when the +300 volts is applied through contacts 2055 of relay 2053 capacitor 2057 is charged to +300 volts. Insertion of the punchcard depresses the switch 2059 thereby energizing the release solenoid 2002 to activate the punchcard switches).

REGULATED FILAMENT SUPPLY (see FIG. 5, blocks 1020, 1022, 1024)

Filament transformer 1020 supplies heater voltage to the tube under test 1026. The primary of the transformer obtains voltage through a punchcard switch 2058 from autotransformer 2060 controlled by motor 2062. The filament regulator circuit consists of the control element of a servo loop circuit. The voltage across the secondary of transformer 1020 is sampled by isolation transformer 2064 and coupled to the primary of transformer 2066. The output of transformer 2066 is rectified and applied to one grid of the differential amplifier 2070. The transformer 2072, which is identical to transformer 2066, is used as the reference voltage source. The output of transformer 2072 is rectified and held constant by the voltage regulator 2074. A voltage divider network consisting of resistors and potentiometers is connected across the regulated voltage supply. The output of potentiometer 2078 is connected through relay contacts 2076 to the second grid of tube 2070. The potentiometer is adjusted such that the AC voltage measured across the heater connections of the TUT 1026 is 6.3 volts. The voltages applied to the grids of tube 2070 are amplified and directly coupled to the grids of the differential cathode follower 2080 which is used to control a null-seeking relay 2084.

This relay 2084 is used to control motor 2062 and is capable of reversing direction of rotation depending on the relative polarity of the error voltage appearing at the grids of tube 2080. When the error voltage is zero, the relay 2084 is deenergized and the operation of the motor is stopped.

The motor adjusts the variable autotransformer 2060 whose AC output voltage is applied to the primary of transformer 1020. Two indicator momentary switch assemblies (see block 1024) are located on the punchcard assembly with the legends TUT FILAMENT NORMAL and TUT FILAMENT EMISSION TEST. Depression of the TUT FILAMENT EMISSION TEST switch 2006 applies 117 volts AC through punchcard switch 2086 and energizes relay 2088. Three sets of contacts are operated by the coil of relay 2088. Contacts 2090 are used in a latching circuit to keep relay 2088 energized. Contacts 2092 apply +28 volts to the lamps of the indicator switches. Contacts 2076 switch a reference voltage to the grid of tube 2070 such that the heater voltage applied to the filament of the TUT is reduced to 5.7 volts. Calibration of this reference voltage is accomplished by means of potentiometer 2094.

FILAMENT TEST CIRCUITRY (see FIG. 5, blocks 1016, and 1018)

In the absence of current flow in the heater circuit of the TUT, tube 2096 in block 1016 is operated at zero bias resulting in sufficient plate current to energize relay 2098. This closes contacts 2104, applying +28 volts to the HEATER OPEN indicator lamp 2010 and removing +28 volts from the HEATER OPERATING lamp 2012 by allowing contacts 2116 to open.

When the heater of the TUT is normal, the current flow induces a voltage in transformer 1018. This voltage is amplified by tube 2106, rectified by a voltage doubler circuit and applied as a negative signal to the grid of tube 2096. The resultant reduction of plate current deenergizes relay 2098. The +28 volts now energizes relay 2108. Contacts 2116 apply +28 volts through punchcard switch 2100 to the HEATER OPERATING indicator lamp 2012.

SEQUENCE CONTROL CIRCUITRY (see FIGS. 4, 5, blocks 1016, 1014, 1034, 1040, 1042)

The energizing of relay 2108 in block 1016 is dependent upon the presence of TUT heater current. Contacts 2114 complete the circuit supplying current from transformer 2111 to the heater of Amperite delay relay 2014. After a 30-second delay this relay 2014 permits application of +28 volts through contacts 2117 to relay 2118. Contacts 2120 are used to switch the Sperry high-voltage power supply 1006 from standby to operate. Contacts 2122 switch +28 volts from the H.V. OFF indicator lamp 2126 to the H.V. ON indicator lamp 2124. Contacts 2128 apply 117 volts AC to operate the TUT blower motor 2130. 2132 switches 117 volts from the BLOWER OFF indicator lamp 2134 to the BLOWER ON indicator lamp 2136 and applies 117 volts to operate the time delay relay 2138.

Following a 45-second delay the contactor 2016 of time delay relay 2138 momentarily applies 117 volts AC through various switches in block 1042 to the motor 2020 which controls the reflector voltage sweep.

BEAM VOLTAGE CONTROL CIRCUITRY (see FIG. 4, blocks 1070b, 1008, 1010, 1012)

The circuitry essentially consists of a dual gas tube regulated power supply (block 1070b) a dual triode differential comparator 2140 a null-seeking magnetically polarized relay 2142, a high-resolution stepping motor 2144 and a programmable voltage divider 1012.

Different klystron tubes require different beam voltages. The comparator tube 2140 compares a portion (one one-hundreds) of the voltage applied to the klystron with a programmed portion of the output (40 v.) of the low-voltage power supply 1070A. Thus, for a beam voltage of −1,000 v., for example, the beam voltage programming means 1012 applies −10 v. to the grid 2146 of comparator 2140. Current flows thru the null-seeking relay 2142 until −1,000 v. is applied to the klystron. At this time, −10 v. is applied to the other grid of the comparator 2140 from the voltage divider 2148, and current through the null-seeking relay 2142 ceases.

Current flow thru the relay 2142 causes current flow through the beam voltage positioning motor 2144. The rotation of the motor 2144 is mechanically coupled to an input variac 2143 of the Sperry voltage supply 1006 which results in adjustment of the beam voltage output. This adjustment continues until the proper feedback voltage from voltage divider 2148 to comparator 2140 is reached. Current thru the null-seeking relay 2142 and motor 2144 thereupon cease.

The beam voltage positioning motor 2144 mechanically coupled to the shaft of the variable autotransformer (in the Sperry high-voltage power supply 1006) used to adjust the beam voltage output. The bidirectional operation of the motor is controlled by null-seeking relay 2142 located between the cathodes of the dual triode 2140. When sufficient differential current flows in the tube, the relay is energized. The relative polarity of this current flow determines the direction of motor rotation. When the cathode currents are equal, the relay is deenergized and the motor stops.

The reference voltage applied to grid 2146 is obtained from the programmable voltage divider 1012 which is connected to a well-regulated 40-volt source. The reference voltage is obtained by selection of resistors in the voltage divider as determined by the punchcard. Voltages from 0.5 to 40.0 volts in 0.5-volt steps are obtainable.

The beam voltage is connected to a 100-to1 voltage divider 2148. The voltage applied to the other grid is one-hundredth of the beam voltage.

Prior to beam control circuit operation, a small positive voltage is clamped to the reference grid 2146. This voltage is used to maintain the beam voltage autotransformer control at the minimum setting. +28 volts is obtained from the sequence control relay 2118 (block 1014) to operate relay 2152 thereby removing the clamp voltage from the reference grid and applying the reference voltage.

REFLECTOR CONTROL CIRCUITRY
ELECTROMECHANICAL CIRCUITS (see FIG. 6, blocks 1042, 1034, 1068)

When the punchcard is inserted, punchcard switch 2154 energizes relay 2156. (This relay is kept energized throughout the test). The control arm of the lower limit switch 2158 is connected to 117 volts AC. Prior to motor operation, the 117 volts AC is applied through switch 2158 keeping relay 2160 energized. The contacts of relay 2160 connect +28 volts to relay 2162 which controls the REFLECTOR OFF and REFLECTOR ON indicator lights, 2164 and 2166.

The momentary closing of the contacts 2016 of time delay relay 2138 (block 1034) connects 117 volts AC through contacts 2174 (relay 2156 energized), contacts 2182 (relay 2180 energized) and contacts 2176 (relay 2170 deenergized) to the reflector motor 2020 to initiate forward reflector voltage sweep. Initial operation of the motor 2020 actuates the lower limit switch 2158 which switches the source of 117 volts AC from time delay relay 2138 to input wire 4.

When the reflector voltage sweep reaches the maximum value, the upper limit switch 2184 is mechanically actuated. One hundred and seventeen volts AC is now connected from terminal 4 through lower limit switch 2158 and upper limit switch 2184 energizing relay 2170. The switching of contacts 2176 reverses direction of motor rotation. The upper limit switch 2184 is returned to the open position. A shunt path is now provided across upper limit switch 2184 through contacts 2168 and 2172. The purpose of this shunt path is to keep relay 2170 energized when the upper limit switch 2184 opens. Contacts 2178 apply operating voltage to relay 2186 (block 1068). The motor 2020 continues rotation in the reverse direction until operation of relay 2188 deenergizes relay 2180 interrupting application of the 117 volts AC.

ELECTRONIC CIRCUITS (see FIG. 6, blocks 1052, 1068, 1042)

A DC voltage proportional to the RF power is obtained from the cathode follower 2034 mounted on the power meter chassis (block 1052). The output from this cathode follower is applied to the input of the voltage amplifier 2190. The input to amplifier 2190 increases in a negative direction with a proportionate increase of RF power. The amplified positive voltage is coupled through cathode follower 2192 and directly coupled to the plate of the charging diode 2194. The output from the cathode diode 2194 is connected to contacts 2196 of relay 2186. During the forward reflector voltage sweep, relay 2186 remains deenergized, connecting the output of diode 2194 to the control grid of the reference electrometer tube 2200. Also connected to the grid of this tube is the storage capacitor 2202. The voltage charge developed across this capacitor is proportional to the RF power. The charge stored by the capacitor 2202 corresponds to the maximum RF power obtained during the sweep.

When the forward sweep is completed, contacts 2178 (relay 2170) apply +28 volts energizing relay 2186. The voltage from the cathode of tube 2194 is switched by relay 2186 to resistor 2204 in the control grid circuit of the electrometer tube 2198.

The reflector voltage is swept in the reverse direction until maximum RF power is obtained from the TUT 1026. At this value of RF power, the voltage developed across resistor 2204 is equal to the voltage stored by the capacitor 2202.

When forward reflector voltage sweep operation is initiated relay 2206 is deenergized, disconnecting the discharge resistor 2208 from capacitor 2202. The capacitor 2202 is charged to an initial positive value of voltage obtained from the cathode circuit of cathode follower 2192. This voltage is directly connected from the output of reference electrometer 2200 to one grid of the dual cathode follower comparator tube 2210 (block 1042). The output from the cathode of the other half of dual triode 2210 is connected to the cathode of triode 2212. The initial positive bias voltage applied to triode 2212 is sufficient to maintain maximum plate voltage in this tube. The plate voltage of triode 2212 is used as a control bias applied to the grid of tube 2214. A maximum plate voltage in triode 2212 results in a maximum plate current flow in triode 2214, causing relay 2188 to remain energized.

During the reverse sweep a voltage that is developed across resistor 2204 is coupled through C.F. 2198 to the second grid of triode 2210. The output from the cathode of the corresponding triode 2210 is connected to the grid of triode 2212. When the voltage developed across resistor 2204 is equal to the charge voltage of capacitor 2202, the grid-to-cathode voltage of triode 2212 is zero. When zero bias exists, the tube operates as a saturated amplifier causing a large drop in plate voltage. This plate voltage, which appears on the grid of tube 2214, causes a reduction of its plate current deenergizing relay 2188. The switching of the relay contacts ungrounds, and therefore deenergizes, relay 2180 and disconnects the 117 volts AC source from motor 2020, thereby stopping the reflector voltage sweep.

The triodes of tube 2216 are operated in parallel and serve to provide a constant current supply to the electrometer tube 2198. The triodes of tube 2218 are similarly used as the supply for the reference electrometer tube 2200.

REFLECTOR CURRENT MEASURING CIRCUIT (see FIG. 5, blocks 1028, 1038, 1030)

Photoresistor 2220 (a Raysistor ECK-5722) contains an incandescent bulb 2222 which illuminates a photoresistive element 2224 whose resistance varies inversely with the intensity of the light source. The photoresistive element and reflector current panel meter 2226 are part of a series circuit energized by a regulated low-voltage power supply. The incandescent bulb is connected in series with the plate of tube 2228 which obtains plate voltage from an isolated power supply. The light intensity of the bulb is determined by the plate current of the tube. Reflector voltage is obtained from reflector sweep potentiometer 2022 which is connected to the tube under test through resistors 2230 and 2232. When current flows in the reflector circuit, a voltage drop occurs across resistors 2230 and 2232. A positive voltage is applied to the grid of tube 2228 causing an increase in plate current, an increase in light intensity, a decrease in the resistance of the photoresistive element 2224 and an increase in current flow in the meter circuit. The reflector current measuring circuit is calibrated by means of resistors 2230 and 2234 such that currents of zero to 5 microamperes in the reflector circuit can be read on the reflector current panel meter 2226.

YIG CONTROL CIRCUITRY (see FIG. 7, blocks 1056, 1062, 1058, 1050)

The YIG filter 1056 obtains its tuning current from a low-voltage power supply 1058 e.g., Kepco Power Supply, Model CK 18-3). This power supply is programmed by a voltage obtained from the output of operational amplifier 2238. Capacitor 2240 and resistors 2242 and 2248 cause the amplifier to operate as a voltage integrator. A negative voltage of a −1.0 volt applied to the input produces a positive ramp voltage across output resistor 2250. The input voltage to amplifier 2238 is obtained from the output of cathode follower 2252. The signal voltage applied to the input of the latter is obtained from the output of tube 2254 which is a dual triode operated as a bistable multivibrator.

When the equipment is first turned on, the multivibrator 2254 can come to equilibrium in either of two states. These operating states result in the application of either +90 volts or −1.0 volt to the input of amplifier 2238. For proper operation of the equipment prior to frequency measurement, +90 volts should be applied to the amplifier 2238. If −1.0 volt is applied, the operational amplifier 2238 initiates the generation of a positive ramp voltage. This voltage is applied through resistor 2256 to the plate of reset thyratron 2258. Also, connected between the plate and control grid of the thyratron is a zener diode 2260. When the amplitude of the ramp voltage reaches the breakdown voltage of the diode, current flows through resistor 2262. The voltage developed across resistor 2262 causes the thyratron to fire. This results in a sharp drop in plate voltage producing a negative pulse at the input of tube 2264 through the capacitor 2265. This pulse is amplified and inverted and applied to one grid of a cathode-coupled dual cathode follower 2272. The positive output pulse appearing at the cathode of the tube 2272 is used as a trigger voltage to invert multivibrator 2254. The result is the desired application of +90 volts to the input of operational amplifier 2238.

Measurement of the frequency of the TUT 1026 is initiated by momentarily depressing the RF FREQUENCY switch 2274 (block 1050). The switch latches +28 volts through relay 2278 to the heater of the Amperite delay relay 2280 (block 1062). At the conclusion of a 3-second delay period, +28 volts is applied through the contacts of relay 2280, energizing relay 2256. −300 volts is applied through resistor 2282, relay 2266 and resistor 2284 to capacitor 2286. When the voltage across capacitor 2286 reaches the ionization potential of the neon glowlamp 2288, a negative pulse is produced across resistor 2290. This pulse is coupled by capacitor 2292 to the grid of an inverter 2264 and then to a cathode-coupled cathode follower 2272. The positive output pulse appearing at the cathode of C.F. 2272 is used as a trigger voltage to invert multivibrator 2254. This results in the application of −1.0 volt to the input of operational amplifier 2238 and the generation of a positive ramp voltage output.

This ramp voltage is applied through resistor 2294 to the programmable power supply 1058. The power supply provides the linear ramp current required to tune the YIG filter 1056.

When the YIG filter tunes to the operating frequency of the TUT, RF power passes through the filter and is detected. The detected negative voltage is applied through resistor 2296 to the input of the differential operational amplifier 2298. The gain of the noninverting amplifier is adjustable by means of potentiometer 2300. The negative output of amplifier 2298 is inverted by amplifier 2302 and applied through cathode follower 2304 as a control voltage to the Schmitt trigger circuit 2306 consisting of a dual triode.

It is characteristic of the YIG filter to generate spurious signals 25 db. below the level of the applied signal. In order to avoid erroneous frequency measurement due to these spurious signals, the gain of the input amplifier 2298 is adjusted so that a minimum RF signal of 0.1 mw (−10 dbm) is required for normal operation. If the applied RF signal is reduced below this threshold level, the tuning current supply to the YIG coil is shut off. The normal RF signal level never exceeds 10 mw (+10 dbm). Therefore the spurious signals never reach the threshold level required for normal operation.

The output of the trigger circuit 2306 is differentiated by an RC network consisting of capacitor 2308 and resistor 2310 and is applied to one input of cathode follower 2312. The corresponding output of this tube is used to trigger the bistable multivibrator 2314. This multivibrator 2314 is controlled by a circuit connected between the grid and plate of its second half, such that the first half is maintained in the cutoff condition and the second half is operated in saturation. When a positive trigger pulse is applied to the grid of the first half, it switches from cutoff to saturation and the second half switches from saturation to cutoff. The resulting increase in plate voltage in the second half is used to initiate the charging of capacitor 2316 through resistors 2318 and 2310. When the voltage across capacitor 2316 reaches the ionization potential of the neon glowlamp 2322, a positive pulse is produced across resistor 2324. This pulse is coupled through the RC network, resistor 2326 and capacitor 2328, to the second grid of M.V. 2315 causing its second half to reswitch from cutoff to saturation. This also results in reswitching the first half from saturation to the quiescent state of cutoff. The double switching cycle of the M.V. simulates the operation of a monostable multivibrator. The duration of the output pulse obtained at the first is determined by the time constant of capacitor 2316 and resistors 2318 and 2320. This time constant is adjustable by potentiometer 2320.

The negative output pulse is differentiated by the RC network resistor 2330 and capacitor 2332 generating a train of two pulses. The leading negative pulse is coupled through diode 2334 to the input of tube 2264.

This pulse is amplified and inverted and applied to one grid of cathode-coupled cathode follower 2272. The positive output pulse appearing at the cathode tube 2272 is used to invert the multivibrator tube 2254. The result is the switching from −1.0 volt to +90 volts at the input of amplifier 2238. The increasing ramp voltage at the output of this amplifier is reset to the minimum value.

The trailing positive pulse appearing at the output of the RC differentiating network resistor 2330 and capacitor 2332 is applied through diode 2336 to the second grid of tube 2272. The output pulse appearing at the cathode of tube 2272 is used to reinvert multivibrator tube 2254, switching the input voltage to amplifier 2238 from +90 volts to −1.0 volt. The process of generating a ramp voltage at the output of the operational amplifier results in concurrent YIG scanning.

The output of operational amplifier 2238 is connected through diode 2238 to the input of the differential operational amplifier 2340. This amplifier is operated as a unity gain voltage follower. The output voltage is equal to the input voltage in amplitude and phase. Capacitor 2342 is connected between the input of the amplifier and ground and charges to the peak of the ramp voltage. During the reset cycle of the ramp voltage, the capacitor 2342 is prevented from discharging by the extremely low leakage characteristic of the coupling diode 2338. The amplifier input impedance is also sufficiently high to prevent capacitor discharge.

The output of amplifier 2340 is connected to the input of another differential operational amplifier 2344, which is operated as a unity gain summing amplifier. In addition to the voltage obtained from the output of amplifier 2340, an additional voltage is applied through resistor 2346 to the input amplifier 2344. The voltage appearing at the output of amplifier 2344 is the algebraic sum of the two voltages applied to the input. This output voltage is connected to a digital voltmeter 1064 and displayed thereby.

To calibrate the digital voltmeter circuit at the low end of the frequency range, a 1 gHz signal is applied and potentiometer 2348 (LOW FREQUENCY CALIBRATION) is adjusted to produce a voltmeter indication of 1.00 volt. (The display now indicates 1.00 gHz.) To calibrate the digital voltmeter circuit at the high end of the frequency range, a 13.0 gHz signal is applied and potentiometer 2294 (HIGH FREQUENCY CALIBRATION) is adjusted to produce a voltmeter indication of 13.0 volts. (The display now indicates 13.0 gHz.)

Triode 2350 operates in conjunction with transistor 2352 to control the FREQUENCY SCAN OPERATING indicator lamp 2354. The control voltage used to operate this circuit is obtained from cathode follower 2252 whose output is either +90 volts or −1.0 volt. When +90 volts is applied, the indicator lamp 2354 is off; when −1.0 is applied the indicator lamp is on.

MICROWAVE SUBASSEMBLY (see FIG. 2)

The microwave components are located as a subassembly 1051 on a chassis. A block diagram of the microwave subassembly is shown in FIG. 1.

The RF power output from the TUT 1026 is connected through the programmable attenuator means 1044 to a single-pole, double-throw coaxial switch 1048. During the power measurement, the output from the coaxial switch 1048 is applied to the power head of the power-metering means 1052. The attenuator is programmed by the punchcard so that the RF power applied to the power head never exceeds 100 mw (+20 dbm). The value of attenuation selected may be 0, 3, 6, 9, 12 or 15 db. The power meter is normally operated on the 100 mw range. To test tubes of low output power, it is necessary to manually switch the range of the power meter to 30 mw (+15 dbm). When manual switching is required, instructions are supplied on the punchcard.

During frequency measurement, power is switched through a fixed 10 db. attenuator 1054 to the YIG filter 1056. The RF output of the YIG filter is detected by a broadband crystal detector 1068. The output of the detector is coupled by coaxial cable to the YIG control circuitry 1062.

PUNCHCARD ASSEMBLY (see FIGS. 4, 5 & 7, blocks 1074, 1012, 1046, 1036)

The punchcard switch assembly e.g., a Hickok card reader) consists of a bank of switches and an electromechanical device used to control the switching action. +300 volts is applied through resistor 2356 through a single-pole, double-throw microswitch 2059 charging capacitor 2057. When the punchcard is fully inserted, it engages the microswitch 2059 causing the capacitor 2057 to discharge through a solenoid 2002. The solenoid 2002 releases a spring-loaded latch 2358 permitting the punchcard to close certain switches as determined by the absence of holes in the punchcard.

To remove the punchcard, it is necessary to depress a knob located on the left side of the punchcard switch. This action opens all switches and releases the punchcard.

I claim:

1. Apparatus for testing the static and dynamic operating characteristics of integral cavity klystron tubes comprising, in combination:
    means for providing an adjustable, regulated filament voltage to the klystron;
    means for testing the continuity of the klystron filament and the quantity of current emitted by said filament;
    means for automatically supplying the correct beam voltage to the klystron;
    means for automatically supplying a voltage to the reflector electrode to sweep the klystron through its various modes of oscillation and lock the klystron into oscillation at its point of maximum RF power output;
    means for determining the frequency and magnitude of the RF power output at its maximum point;
    means for indicating the continuity condition and amount of emission of the filament, the amounts of beam current, beam voltage, and reflector current, and the magnitude and frequency of the RF power output of the klystron; and
    means connected to the aforesaid means for controlling the times of application of filament, beam and reflector voltages to the klystron.

2. Apparatus for testing the static and dynamic operating characteristics of integral cavity klystron tubes comprising, in combination:
    means for applying electrode voltages to a klystron and deriving an output therefrom:

filament control and regulator means for providing an adjustable, regulated filament voltage to said klystron:

filament continuity and emission test means for testing the continuity of the klystron filament and the quantity of current emitted by the filament.

beam voltage programming and control means for providing a reference voltage proportional to a desired beam voltage, for comparing a fraction of the applied voltage to the reference voltage and for adjusting the applied beam voltage until the compared voltage is equal to the reference voltage.

reflector logic and control means for placing a sawtooth voltage on the klystron reflector electrode to sweep the klystron through its various modes of oscillation, store a voltage proportional to the maximum RF power output and lock the tube into oscillation at its point of maximum RF power output;

RF power and frequency determining means for measuring the magnitude and frequency of the output of the klystron at its point of maximum RF power output;

indicating means for indicating the continuity condition and amount of emission of the filament, the amounts of beam current, beam voltage and reflector current, and the magnitude and frequency of the RF power output of the klystron; and connected to said aforementioned means sequence-of-operations control means for controlling the application of filament, beam and reflector voltages to the klystron.

3. Apparatus as set forth in claim 2, wherein said means for providing an adjustable, regulated filament voltage is capable of providing the normal rated filament voltage and also a voltage which is 10 percent below the normal rating.

* * * * *